US 8,975,569 B2

(12) United States Patent
Yamazaki

(10) Patent No.: US 8,975,569 B2
(45) Date of Patent: Mar. 10, 2015

(54) SOLID-STATE IMAGING DEVICE, DRIVING METHOD THEREOF, AND SOLID-STATE IMAGING SYSTEM TO PERFORM DIFFERENCE PROCESSING USING EFFECTIVE AND REFERENCE PIXELS

(75) Inventor: Kazuo Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/462,433

(22) Filed: May 2, 2012

(65) Prior Publication Data

US 2012/0286138 A1    Nov. 15, 2012

(30) Foreign Application Priority Data

May 12, 2011    (JP) .................................. 2011-107392

(51) Int. Cl.
*H01L 27/00* (2006.01)
*H04N 9/64* (2006.01)
*H04N 5/365* (2011.01)
*H04N 5/378* (2011.01)

(52) U.S. Cl.
CPC ............. *H04N 5/3655* (2013.01); *H04N 5/378* (2013.01)
USPC ...................................... 250/208.1; 348/245

(58) Field of Classification Search
CPC ........................... H04N 5/3658; H04N 5/3675
USPC .................. 250/208.1; 348/241, 245
See application file for complete search history.

(56) References Cited

U.S. PATENT DOCUMENTS

| 6,344,877 | B1 * | 2/2002 | Gowda et al. ................. 348/245 |
| 7,525,080 | B2 * | 4/2009 | Barna et al. ................ 250/208.1 |
| 2005/0088549 | A1 * | 4/2005 | Hatano et al. ................. 348/241 |
| 2007/0152137 | A1 | 7/2007 | Barna |

FOREIGN PATENT DOCUMENTS

| CN | 1612590 A | 5/2005 |
| CN | 1976402 A | 6/2007 |
| CN | 101296330 A | 10/2008 |
| JP | 2008-271280 A1 | 11/2008 |

OTHER PUBLICATIONS

Iliana L. Fujimori, Ching-Chun Wang, and Charles G. Sodini, "A 256×256 CMOS Differential Passive Pixel Imager with FPN Reduction Techniques," ISSCC2000 /Session 6/ Image Sensors / Paper MP 6.3,pp. 105-107.

Iliana L. Fujimori, Ching-Chun Wang, and Charles G. Sodini, "A 256×256 CMOS Differential Passive Pixel Imager with FPN Reduction Techniques," IEEE Journal of Solid-State Circuits, vol. 35, No. 12, Dec. 2000, pp. 2031-2037.

* cited by examiner

*Primary Examiner* — Thanh Luu
(74) *Attorney, Agent, or Firm* — Canon USA, Inc. IP Division

(57) ABSTRACT

A solid-state imaging device is configured such that an effective pixel and a reference pixel are connected to first and second signal lines, respectively. The solid-state imaging device includes a difference signal output unit configured to perform difference processing on a signal output from a first amplifying transistor included in the effective pixel and a signal output from a second amplifying transistor included in the reference pixel. The difference signal output unit is provided separately from the first and second amplifying transistors.

20 Claims, 15 Drawing Sheets

SOLID-STATE IMAGING DEVICE, DRIVING METHOD THEREOF, AND SOLID-STATE IMAGING SYSTEM TO PERFORM DIFFERENCE PROCESSING USING EFFECTIVE AND REFERENCE PIXELS

TECHNICAL FIELD

One disclosed aspect of the embodiments relates to a solid-state imaging device having effective pixels and reference pixels, a driving method of the solid-state imaging device, and a solid-state imaging system having the solid-state imaging device.

BACKGROUND

A solid-state imaging device is known, which is configured to have effective pixels that output signals based on photoelectric conversion, and reference pixels that output reference signals without photoelectric conversion. The solid-state imaging device reduces noise from an output signal thereof by obtaining a differential signal between a signal output by the effective pixel and the reference signal output by the reference pixel.

In solid-state imaging devices, miniaturization of a pixel size has been advanced to enhance resolution. However, reduction of the area of a photoelectric conversion unit and that of sensitivity of the solid-state imaging device occur with progression of the miniaturization of a pixel size. The solid-state imaging devices are required to proceed with the miniaturization of a pixel size while the reduction of the area of a photoelectric conversion unit is suppressed, to thereby satisfy both of resolution enhancement and suppression of the reduction of sensitivity. Japanese Patent Application Laid-Open No. 2008-271280 discusses a device that performs correlated double sampling (CDS) using plural effective pixels, and configuring a differential pair of an effective pixel and a reference pixel that has properties equivalent to those of each effective pixel except for having no photoelectric conversion function. Each effective pixel stores electric charge output by a photoelectric conversion element and is provided with a floating diffusion capacitor Cfd connected to the gate of an amplifying metal-oxide semiconductor (MOS) transistor. Similarly, each reference pixel stores electric charge and is provided with a floating diffusion capacitor Cfd connected to the gate of an amplifying MOS transistor. In addition, each of the effective pixels and the reference pixels is provided with a capacitor Cio. The capacitor Cio has two terminals, one of which is connected to an output portion of the differential pair, and the other of which is connected to the gate of an amplifying MOS transistor. In the device discussed in Japanese Patent Application Laid-Open No. 2008-271280, the capacitor Cio is very small in capacitance, as compared with the floating diffusion capacitor Cfd. Hereinafter, the capacitor Cio is referred to also as a minute capacitor Cio.

The solid-state imaging device discussed in Japanese Patent Application Laid-Open No. 2008-271280, in which each differential pair is configured by an effective pixel and a reference pixel, may suppress both of a reset noise and a fixed-pattern noise included in each of signals output from the effective pixels and the reference pixels.

Japanese Patent Application Laid-Open No. 2008-271280 discusses a circuit configuration in which each differential pair is configured by an effective pixel and a reference pixel, and in which the amplifying MOS transistors respectively provided in an effective pixel and a reference pixel operate as MOS transistors of an input stage of the differential pair. Accordingly, the amplifying MOS transistor of each of the effective pixels and the reference pixels has a parameter for serving as an amplifying MOS transistor that outputs a signal based on an amount of electric charge stored by the floating diffusion capacitor Cfd, and another parameter for serving as a MOS transistor of the input stage of the differential pair. Thus, it is required to balance the parameter for serving as an amplifying MOS transistor against the parameter for serving as a MOS transistor of the input stage of the differential pair. Accordingly, it is problematic that the flexibility of design is not high.

SUMMARY

According to an aspect of the embodiments, a solid-state imaging device includes an effective pixel including a photoelectric conversion unit configured to generate electric charge by photoelectric conversion and a first amplifying transistor configured to output a signal based on the electric charge generated by the photoelectric conversion unit, a reference pixel including a second amplifying transistor configured to output a signal based on a voltage applied thereto, a first signal line to which the effective pixel is connected, the first signal line being configured to transmit a signal output by the first amplifying transistor, a second signal line to which the reference pixel is connected, the second signal line being configured to transmit a signal output by the second amplifying transistor, and a difference signal output unit provided separately from the first amplifying transistor and the second amplifying transistor, the difference signal output unit being connected to the first signal line and the second signal line and configured to perform difference processing on a difference between a signal output by the first amplifying transistor and a signal output by the second amplifying transistor and to output a difference signal representing a result of the difference processing.

According to yet another aspect of the embodiments, there is provided a method for driving a solid-state imaging device. The solid-state imaging device includes an effective pixel including a photoelectric conversion unit configured to generate electric charge by photoelectric conversion and a first amplifying transistor configured to output a signal based on the electric charge generated by the photoelectric conversion unit, a reference pixel including a second amplifying transistor configured to output a signal based on a voltage applied thereto, a first signal line being configured to transmit a signal output by the first amplifying transistor, a second signal line being configured to transmit a signal output by the second amplifying transistor, and a difference signal output unit provided separately from the first amplifying transistor and the second amplifying transistor, the difference signal output unit configured to perform difference processing on a difference between a signal transmitted by the first signal line and a signal transmitted by the second signal line and to output a difference signal representing a result of the difference processing. The method includes transmitting the signals to the difference signal output unit through the first signal line and the second signal line, respectively, and performing, via the difference signal output unit, difference processing on the signals transmitted through the first signal line and the signal transmitted through the second signal line.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the embodiments and, together with the description, serve to explain the principles of the disclosure.

DESCRIPTION OF THE EMBODIMENTS

Various exemplary embodiments, features, and aspects of the disclosure will be described in detail below with reference to the drawings.

First, a configuration of a solid-state imaging device according to a first exemplary embodiment is described hereinafter. Then, an operation of the solid-state imaging device is described. In the follow description, an example of configuring each pixel by an N-channel transistor is described. If each pixel is configured by a P-channel transistor, the embodiments may be applied to the solid-state imaging device by reversing polarity of each voltage in the case of configuring each pixel by an N-channel transistor.

Figure 1:
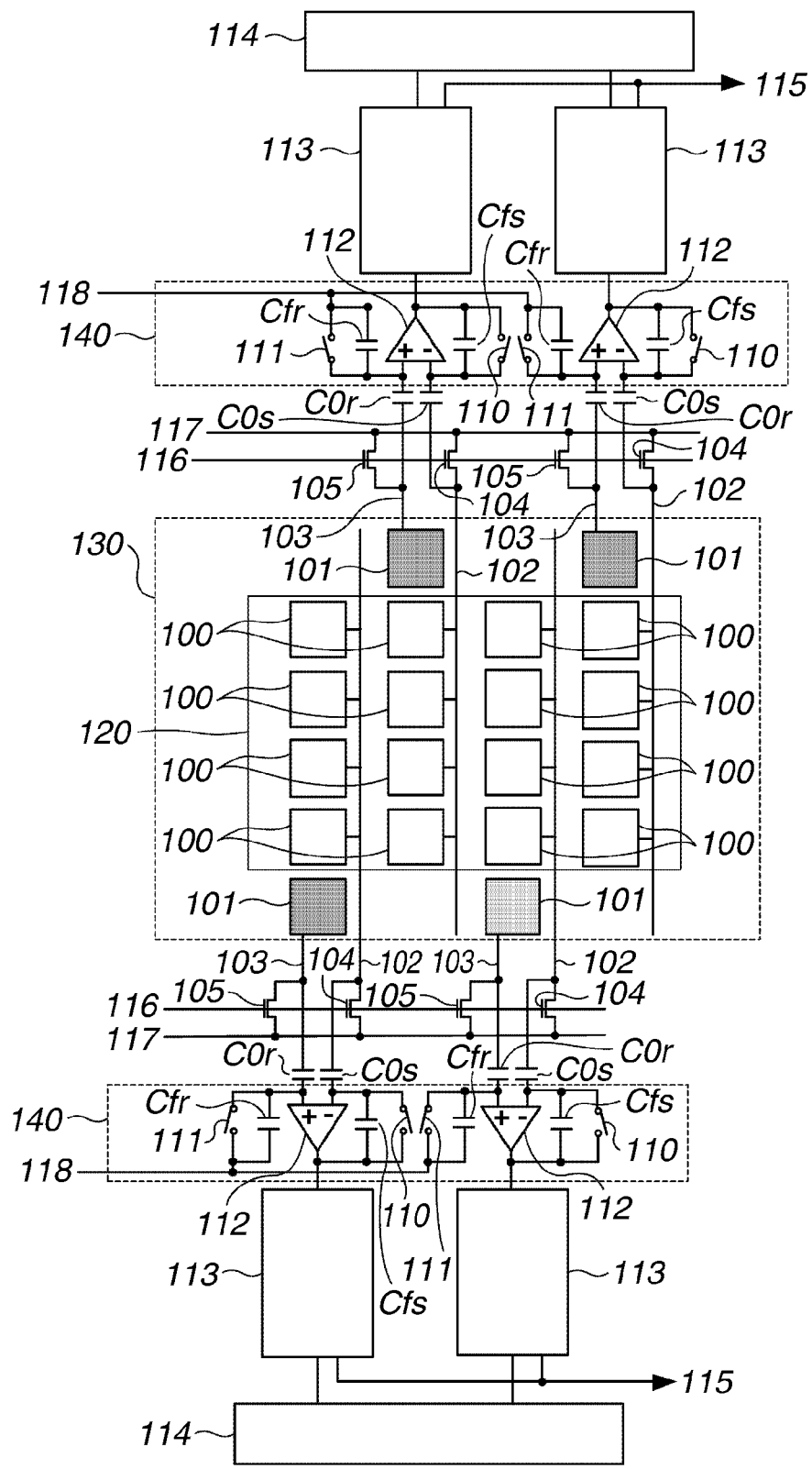
FIG. 1 is a block diagram illustrating a first exemplary embodiment.

FIG. 1 is a block diagram illustrating an example according to the first exemplary embodiment. Each effective pixel 100 outputs signals based on incident light thereon by photoelectric conversion. Each reference pixel 101 outputs signals without performing photoelectric conversion. A plurality of lines and a plurality of columns of effective pixels are provided in the imaging device. The reference pixel 101 is arranged on each column provided with the effective pixels 100. A pixel region 130 is formed by arranging a plurality of lines of the effective pixels 100 and the reference pixels 101, and a plurality of columns of the effective pixels 100 and the reference pixel 101. Hereinafter, the pixel region 130 in which the effective pixels 100 and the reference pixels 101 are arranged is described by being distinguished from an effective-pixel region 120 in which only the effective pixels 100 are arranged.

The reference pixel 101 is provided closer to a differential amplifier 112 described below than any effective pixels 100 belonging to the same column as that to which the reference pixel 101 belongs. The reference pixel 101 is provided at an end portion of the pixel region 130, which is located at the side of the differential amplifier 112. The expression "reference pixel 101 is provided closer to a differential amplifier 112 . . . than any effective pixels" more specifically means that an end portion of the effective pixel 100, which is located at the side of the differential amplifier 112, is close to the differential amplifier 112, as compared to an end portion of the effective pixel 100, which is located at the side of the differential amplifier 112. A plurality of effective pixels 100 arranged in a direction along a column are electrically connected to a first vertical signal line 102. Each reference pixel 101 is electrically connected to a second vertical signal line 103. Hereinafter, a signal from the reference pixel 101, which is transmitted by the second vertical signal line 103, is referred to as a reference signal.

Load MOS transistors 104 and 105 have drains electrically connected to the first vertical signal line 102 and the second vertical signal line 103, respectively. The load MOS transistors 104 and 105 serve as current sources that supply electric current to the first vertical signal line 102 and the second vertical signal line 103, respectively. The load MOS transistor 104 is referred to as a first transistor, while the load MOS transistor 105 is referred to as a second transistor. In each of the load MOS transistors 104 and 105, a common gate line 116 is electrically connected to a gate thereof serving as a control electrode, and a ground (GND) line 117 is electrically connected to a source thereof. The common gate line 116 is a control signal line to which control signals determining an electric-current value of electric current supplied to each of the first vertical signal line 102 and the second vertical signal line 103 are applied.

Capacitors C0s, C0r, Cfs, and Cfr and switches 110 and 111 are provided in the device. Each differential amplifier 112 is an example of a differential signal output unit 140. Each differential amplifier 112 differentially amplifies a signal transmitted by the first vertical signal line 102 from the effective pixel 100, and a reference signal transmitted by the second vertical signal line 103, and outputs the differentially-amplified signals.

The differential amplifiers 112 respectively provided in a plurality of columns are alternately arranged at ends in a direction of each column of the pixel region 130. It is useful that the capacitors C0s and C0r have the same capacitance value. In addition, it is useful that the capacitors Cfs and Cfr have the same capacitance value. First CDS described below is performed by the capacitors C0s and C0r.

This is intended to set a gain of the signal output from the effective pixel 100 to be equal to that of the reference signal. A gain of the differential amplifier 112 is determined by a capacitance ratio C0s/Cfs and another capacitance ratio C0r/Cfr. Each of the capacitors Cfs and Cfr is configured by a plurality of capacitors, so that the capacitance value of each of the capacitors Cfs and Cfr is variable. Thus, the gain of the differential amplifier 112 may be changed. If the capacitance value of each of the capacitors Cfs and Cfr is large, compared to that of an associated one of the capacitors C0s and C0r, the gain of the differential amplifier 112 is low. On the other hand, if the capacitance value of each of the capacitors Cfs and Cfr is small, compared to that of an associated one of the capacitors C0s and C0r, the gain of the differential amplifier 112 is high.

A reference voltage line 118 is used to supply a reference voltage Vref to the differential amplifier 112. A differential circuit utilizing switched capacitors is configured by the differential amplifier 112, the capacitors C0s, C0r, Cfs, and Cfr, and switches 110 and 111. A signal output from the effective pixel 100 is input to an inverting input terminal (−) of the differential amplifier 112, while the reference signal is input to a non-inverting input terminal (+) thereof. A signal processing circuit 113 is electrically connected to the differential amplifier 112.

A plurality of components of each of types such as the effective pixel 100, the reference pixel 101, the first vertical signal line 102, the second vertical signal line 103, and the differential amplifier 112 are provided corresponding to a plurality of columns. A horizontal shift register (hereinafter designated as HSR) 114 is electrically connected to a plurality of signal processing circuits 113. The HSR 114 selects the signal processing circuit 113 from a plurality of signal processing circuits 113. A signal is output from the signal processing circuit 113 selected by the HSR 114. The output signal serves as a signal 115 output by the solid-state imaging device.

Figure 2:
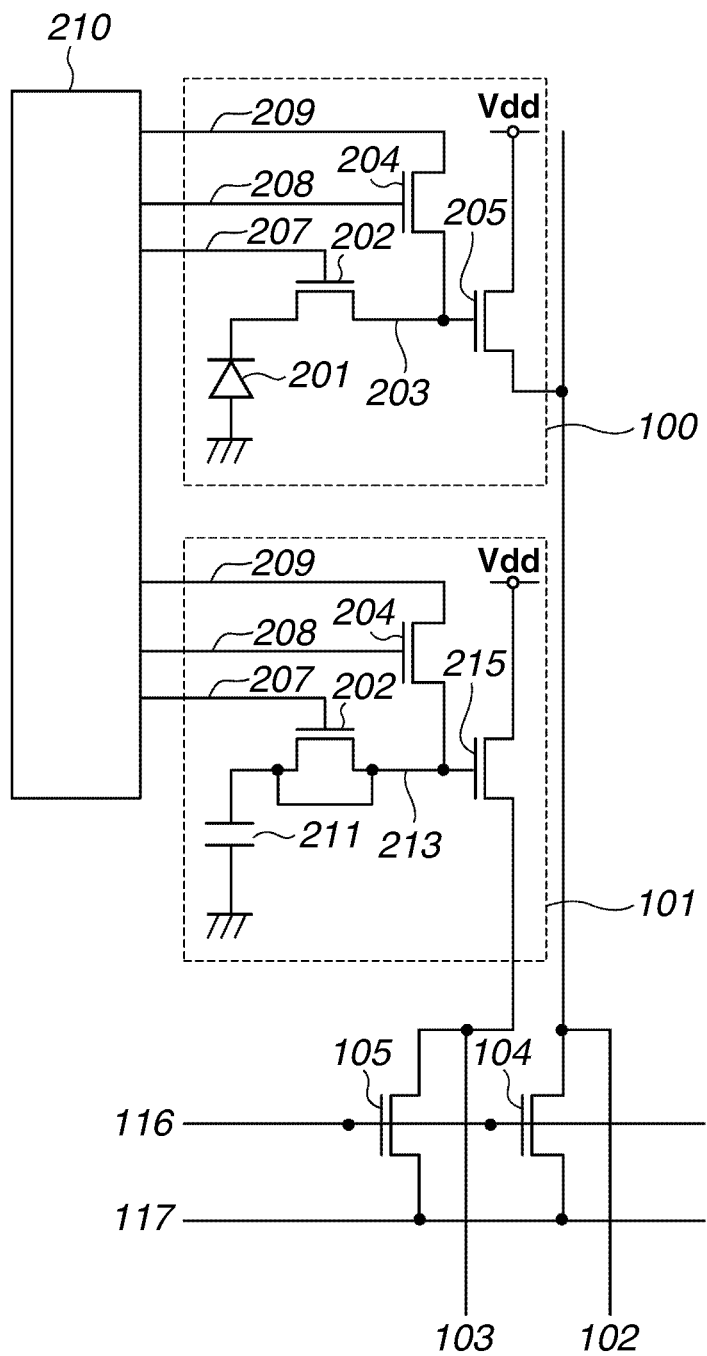
FIG. 2 is an equivalent circuit diagram illustrating the inside of a pixel according to the first exemplary embodiment.

FIG. 2 illustrates an example of each of the effective pixel 100 and the reference pixel 101. A photodiode 201 is a photoelectric conversion unit that converts incident light into electric charge by photoelectric conversion. A transfer MOS transistor 202 is such that the source, the gate, and the drain thereof are electrically connected to the photodiode 201, a transfer control line 207, and a floating diffusion region (hereinafter designated as an FD region), respectively. The FD region 203 stores electric charge transferred thereto from the photodiode 201 via the transfer MOS transistor 202. If a solid-state imaging device is formed on a semiconductor substrate, the FD region is formed of, e.g., an impurity diffused region. A reset MOS transistor 204 is such that the source, the gate, and the drain thereof are electrically connected to the FD region 203, a reset control line 208, and a reset supply line 209, respectively. An amplifying MOS transistor 205 is such that the gate serving as a control electrode, the drain and the source thereof are electrically connected to the FD region 203, a voltage supply Vdd, and the vertical signal line 102, respectively. The amplifying MOS transistor 205 is referred to as a first amplifying transistor. An amplifying MOS transistor 215 of the reference pixel 101, which is described below, is referred to as a second amplifying transistor. The amplifying MOS transistor 205 outputs to the first vertical signal line 102 a signal based on a voltage applied to the gate thereof serving as a control electrode. Thus, the amplifying MOS transistor 205 outputs to the first vertical signal line 102 a signal based on electric charge stored in the FD region 203. Each of the reset control line 208, the reset supply line 209, and the transfer control line 207 is electrically connected to a line selection unit 210.

The reference pixel 101 is provided with a capacitor 211, instead of the photodiode 201. The reference pixel 101 may be configured to have the same equivalent circuit as that of the effective pixel 100, except that the capacitor is provided therein instead of the photodiode. The source of an amplifying MOS transistor 215 is electrically connected to the second vertical line 103. The transfer MOS transistor 202 of the reference pixel 101 may be configured to have the same structure as that of the transfer MOS transistor 202 of the effective pixel 100. As illustrated in FIG. 2, the reference pixel 101 may be configured so that the source and the drain of the transfer MOS transistor 202 are short-circuited to each other. If the pixel 101 is brought into this configuration, the potential level of the FD region 213 may be made equal to that of the capacitor 211. Consequently, influence of noise generated due to switching between an on-state and an off-state of the transfer MOS transistor 202 may be reduced. Similarly, the reference pixel 101 may be configured without the transfer MOS transistor 202 such that the FD region 213 and the capacitor 211 are connected to each other. Hereinafter, the present exemplary embodiment is described by assuming that the source and the drain of the transfer MOS transistor 202 of the reference pixel 101 are short-circuited to each other, as illustrated in FIG. 2.

The transfer control line 207, the reset control line 208, and the reset supply line 209 of each of the effective pixel 100 and the reference pixel 101 are electrically connected to the line selection unit 210.

Figure 3A:
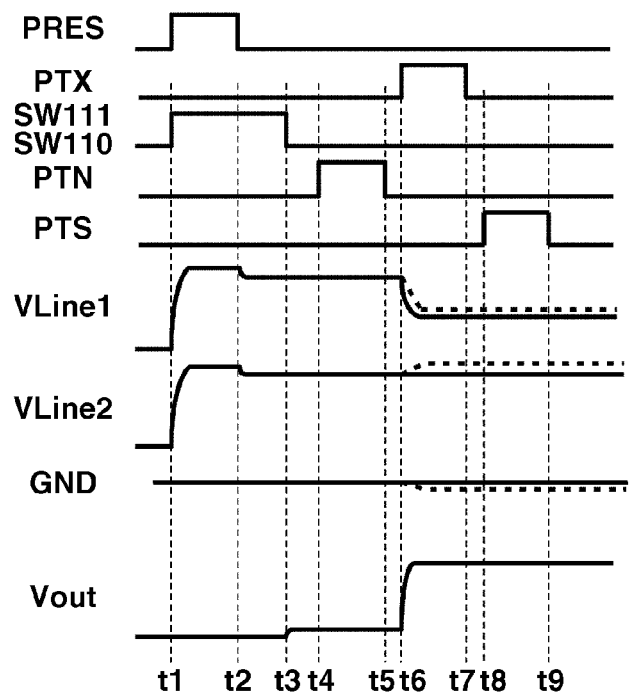
FIGS. 3A and 3B are timing charts illustrating a driving method according to the first exemplary embodiment.

FIG. 3A is a timing chart exemplifying a driving method for the solid-state imaging device illustrated in FIGS. 1 and 2. A pulse PRES is applied to the reset control line 208. A pulse PSEL is applied to the transfer control line 207. Pulses PTN and PTS are applied to the signal processing circuit 113 from, e.g., a timing generating unit (not illustrated). A signal output from the differential amplifier 112 is subjected to second CDS described below at the signal processing circuit 113 by applying the pulses PTS and PTN to the signal processing circuit 113. FIG. 3A also illustrates an electric-potential level VLine1 of the first vertical signal line 102, an electric-potential level VLine2 of the second signal line 103, an electric-potential level GND of the GND line 117, and an electric-potential level Vout of an output signal from the differential amplifier 112.

Referring to the timing chart illustrated in FIG. 3A, when the level of the pulse is set to be high level (hereinafter designated as H-level), electrical connection is caused between the source and the drain of the MOS transistor to which the pulse is applied. On the other hand, when the level of the pulse is set to be low level (hereinafter designated as L-level), electrical disconnection is caused between the source and the drain of the MOS transistor to which the pulse is applied. If a MOS transistor is used which is adapted such that electrical connection between the source and the drain thereof is caused by applying to the gate thereof a pulse whose level is L-level, an operation similar to that of the present exemplary embodiment may be implemented by inverting H-level and L-level of the pulse illustrated in FIG. 3A.

Hereinafter, a driving method of the solid-state imaging device according to the present exemplary embodiment is described chronologically since time t1 with reference to the timing chart illustrated in FIG. 3A.

At time t1, the level of the pulse PRES to be applied to the effective pixel 100 and the reference pixel 101 is set at H-level. In addition, the potential level of each of the FD regions 203 and 213 is set at a reset level by applying a signal to the reset supply line 209. When the level of the pulse PRES is set at H-level, both of the switches 110 and 111 are tuned on.

At time t2, the level of the pulse PRES is changed to L-level to cancel the reset of each of the FD regions 203 and 213. The potential level of each of the FD regions 203 and 213 is lowered from the reset level by charge injection caused when electrical disconnection between the source and the drain of the reset MOS transistor 204 is caused. Accordingly, the potential levels of signal outputs by the amplifying MOS transistors 205 and 215 are lowered. Thus, the electric-potential levels Vline1 and Vline2 are lowered.

At time t3, the switches 110 and 111 are turned off. Signals output by the amplifying MOS transistors 205 and 215 are stored in the capacitors C0s and C0r. Signals representing the output by the amplifying MOS transistors 205 and 215 at time t3 are hereinafter referred to as "reset signals". The output potential level Vout of the differential amplifier 112 is raised by charge injection caused by turning off the switches 110 and 111. The output potential level Vout is given by the following expression:

$$V\text{out} = V\text{ref} + V\text{off}$$

where "Vref" denotes the reference voltage and "Voff" denotes an offset voltage of the differential amplifier 112. A signal representing the output voltage level Vout of the differential amplifier 112 in this condition is hereinafter referred to as an "N signal".

At time t4, the level of the pulse PTN is set at H-level. Thus, an N signal output by the differential amplifier 112 is read out to the signal processing circuit 113.

At time t5, the level of the pulse PTN is changed to L-level. In addition, the reading of the N signal to the signal processing circuit 113 is finished.

At time t6, the level of the pulse PTX to be applied to each of the effective pixel 100 and the reference pixel 101 is set at H-level.

Consequently, electric charge generated by the photodiode 201 is transferred to the FD region 203. A signal output by the amplifying MOS transistor 205, based on the electric charge stored in the FD region 203, is transmitted to the first vertical signal line 102. A Signal representing the output by the amplifying MOS transistor 205 in this condition is hereinafter referred to as a "photoelectric conversion signal". The electric-potential level of the first vertical signal line 102 is lowered according to the electric charge stored in the FD region 203. It is sufficient that photoelectric conversion is performed by the photodiode 201 within a time period since time t7, at which the level of the pulse PTS changes from H-level to L-level, in the last signal read period to time t6 in a current signal read period. Each signal read period is a time period since time t1 to time t9. Because photoelectric conversion is not performed by the reference pixel 101, the electric-potential level of the FD region 213 is not changed from the level at time t5, unless the electric-current value of electric current supplied from the load MOS transistor 105 varies. Thus, the reference signal is unchanged since the reset is performed. The capacitors C0r and C0s store the reset signals by turning off the switches 110 and 111 at time t3. Accordingly, if the electric-potential level of the FD region 203 changes at time t6, a signal based on the difference between the photoelectric conversion signal and the reset signal is input to the terminal of the differential amplifier 112, which is connected to the first vertical signal line 102. A signal based on the difference between the reset signal stored at time t3 and the signal output from the amplifying MOS transistor 215 at time t6 is output to the terminal of the differential amplifier 112, which is connected to the second vertical signal line 103. As described previously, photoelectric conversion is not performed by the reference pixel 101. Thus, unless the electric-current value of electric current supplied from the load MOS transistor 105 varies, the electric-potential level Vline2 of the second vertical signal line 103 is unchanged. Therefore, if the electric-potential level of the second vertical signal line 103 is unchanged, a signal representing the level thereof at time t3 is input to the terminal of the differential amplifier 112, which is connected to the second vertical signal line 103. The first CDS is performed by the capacitors C0s and C0r according to the above operation. The output electric-potential level Vout of the differential amplifier 112 at time t6 corresponds to the difference between the photoelectric conversion signal amplified according to the capacitance ratio C0s/Cfs and the reference signal amplified according to the capacitance ratio C0r/Cfr. A signal representing the output electric-potential level corresponding to the difference is hereinafter referred to as an "S signal".

The signal-levels of the pulses PTX respectively applied to the reference pixel 101 and the effective pixel 100 of the N-th line (N is a natural number equal to 1 or more), which belongs to the same column as that to which the reference pixel 101 belongs, are simultaneously set at H-level. Thus, the reference signal output from the reference pixel 101 and the photoelectric conversion signal output from the effective pixel 100 of the N-th line are simultaneously output to the signal processing circuit 113. More specifically, when a signal based on incident light coming from the effective pixel 100 of the first line is read, the signal-level of the pulse PTX to be applied to the effective pixel 100 of the first line, and that of the pulse PTX to be applied to the reference pixel 101 belonging to the same column as that to which the effective pixel 100 belongs are simultaneously set at H-level. This operation is performed when a photoelectric conversion signal is read from each line of the effective pixels 100. The signal output from the effective pixel 100, and the reference signal are simultaneously read.

At time t7, the level of the pulse PTX is changed from H-level to L-level. Thus, the photodiode 201 and the FD region 203 are electrically disconnected from each other.

At time t8, the S signal is read to the signal processing circuit 113 by changing the level of the pulse PTS to H-level.

At time t9, the reading of the S signal to the signal processing circuit 113 is finished by changing the level of the pulse PTS to L-level.

The signal processing circuit 113 outputs a difference between the read S signal and the read N signal. The offset voltage Voff of the differential amplifier 112, which is included in the S signal, is subtracted therefrom by this difference processing. That is, the second CDS is performed by the signal processing circuit 113. Then, a signal is output from the signal processing circuit 113 selected by the HSR 114. This signal is the signal 115 output by the solid-state imaging device.

The solid-state imaging device according to the present exemplary embodiment has a configuration in which the amplifying MOS transistors 205 and 215 are provided separately from the differential amplifier 112. Accordingly, the solid-state imaging device according to the present exemplary embodiment has an advantage in increasing the flexibility of setting parameters for the amplifying MOS transistors 205 and 215, as compared with the solid-state imaging device having a configuration in which the amplifying MOS transistors serve also as MOS transistors of the input stage of the differential amplifier. The term "parameters" denotes various factors e.g., the area of a gate, a voltage amplification ratio, a current amplification ratio, a threshold voltage, and an allowable power dissipation, which affect operations of transistors.

The solid-state imaging device discussed in Japanese Patent Application Laid-Open No. 2008-271280 needs to make the effective pixel and the reference pixel equal to each other in the capacitance ratio between the minute capacitor Cio and the floating diffusion capacitor Cfd in order to obtain the difference between signals respectively output by the effective pixel and the reference pixel and to accurately reduce noise superimposed on the signal output by the effective pixel. For the purpose of reducing 1/f noise without suppressing the area of the photodiode 201 of each effective pixel 100, it is considered that the area of the gate of the amplifying MOS transistor 215 of the reference pixel 101 is increased. If the area of the gate of the amplifying MOS transistor of the reference pixel is increased in the circuit of the configuration discussed in Japanese Patent Application Laid-Open No. 2008-271280, the floating diffusion capacitor Cfd increases with an increase of the parasitic capacitance. Therefore, it is required to adjust the capacitance ratio between the minute capacitor Cio and the floating diffusion capacitor Cfd. However, according to the configuration of the present exemplary embodiment, the solid-state imaging device may be configured not by providing a minute capacitor Cio in each of the effective pixel 100 and the reference pixel 101. Accordingly, the area of the gate of the amplifying MOS transistor 215 may be increased without adjusting the minute capacitor Cio and the floating diffusion capacitor Cfd. Thus, influence of 1/f noise may be reduced.

The reference pixel 101 is provided outside the effective-pixel region 120. Therefore, the area of the gate of the amplifying MOS transistor 215 of the reference pixel 101 maybe increased, which serves as the control electrode for the amplifying MOS transistor 215, without suppressing the area of the photodiode 201. Accordingly, the influence of 1/f noise may be reduced. The reference pixel 101 is provided closer to the differential amplifier 112 than the effective pixel 100. Consequently, the wiring length of the second vertical signal line 103 may be shortened. In addition, the solid-state imaging device may be configured to inhibit the second vertical signal line 103 from penetrating into the effective-pixel region 120. Consequently, the area of the photodiode 201 is not suppressed.

Even in the case of making the amplifying MOS transistors 205 and 215 equal in the area of the gate to each other, the solid-state imaging device according to the present exemplary embodiment has an advantage in that the differential amplifier 112 maybe designed independent of the parameters for the amplifying MOS transistors 205 and 215.

The voltage supply Vdd of each of the effective pixel 100 and the reference pixel 101 is provided separately from a power supply (not illustrated) of the differential amplifier 112. Consequently, the differential amplifier 112 may be operated at a voltage different from the voltage supplied by the voltage supply Vdd to the effective pixel 100 and the reference pixel 101.

The solid-state imaging device according to the present exemplary embodiment has an advantage in that even in the case of making the amplifying MOS transistor 215 smaller in size than the amplifying MOS transistor 205, the differential amplifier 112 maybe designed independent of the parameters for the amplifying MOS transistors 205 and 215. In addition, because the size of the amplifying MOS transistor 215 may be reduced, the area of the effective-pixel region 120 may be increased by the reduced size of the amplifying MOS transistor 215. Accordingly, degradation in sensitivity may be reduced.

In the solid-state imaging device discussed in Japanese Patent Application Laid-Open No. 2008-271280, an electric-current source connected to the vertical signal line supplies electric current to the signal line from a source electrode, via a gate electrode, and a drain electrode. Thus, when the effective pixel from which a signal is read is selected, the electric-current value of electric current flowing through the vertical signal line temporarily varies. A time taken to stabilize the variation of the electric-current value is subjected to rate-controlling according to the electric-current value of the electric-current source of the differential amplification circuit. Therefore, in order to read a signal without being affected by the variation of the electric-current value of the signal line, it is required to provide a standby time since the effective pixel is selected until the electric-current value of electric current flowing through the vertical signal line is stabilized.

On the other hand, in the solid-state imaging device described in the present exemplary embodiment, an output of each pixel is given as a voltage output of a source follower circuit. Thus, variation in the electric-potential level of the vertical signal line is not subjected to the rate-controlling according to the electric-current value of electric current flowing through the electric-current source. Therefore, when an effective-pixel signal is read by vertically scanning a plurality of effective pixels 100, the solid-state imaging device described in the present exemplary embodiment may reduce the standby time since the effective pixel is selected until the variation of electric current flowing through the signal line is stabilized, as compared with the solid-sate imaging device discussed in Japanese Patent Application Laid-Open No. 2008-271280.

In addition, in the solid-sate imaging device discussed in Japanese Patent Application Laid-Open No. 2008-271280, the minute capacitor Cio and the floating diffusion capacitor Cfd are provided in each effective pixel. On the other hand, the solid-state imaging device according to the present exemplary embodiment is not provided with the minute capacitor Cio. If it is considered that the same number of effective pixels are provided on the same area in each of the solid-sate imaging device discussed in Japanese Patent Application Laid-Open No. 2008-271280 and that according to the present exemplary embodiment, the solid-state imaging device according to the present exemplary embodiment may set the area of the photoelectric conversion unit to be larger than that of the photoelectric conversion unit of the former solid-state imaging device. Therefore, a reduction in sensitivity may be suppressed.

Next, while describing a dashed line indicated in a graph representing each of the levels VLine1, Vline2, and GND in FIG. 3A, it is described hereinafter that horizontal smears and lateral stripes, which are problematic in images output by the solid-state imaging device, may be reduced by the solid-state imaging device according to the present exemplary embodiment.

It is assumed that intense light is incident upon a part of effective pixels 100 of the effective-pixel region 120. The electric-current potential level of the first vertical signal line 102 is greatly lowered by an effective-pixel signal output from the effective pixel 100 upon which the intense light is incident. If the incident light is very intense, a source-drain voltage of the load MOS transistor 104 is close to 0 volts (V). If the incident light is extremely intense, the load MOS transistor 104 may be turned off. Electric current flowing through the GND line 117 changes according to the number of load MOS transistors 104 that are turned off. In addition, electric current flowing through each of the load MOS transistors 104 and 105 changes due to a voltage drop caused by impedance of the GND line 117 and electric current flowing through the GND line 117. Accordingly, the larger the number of effective pixels 100, upon each of which intense light is incident, of a line, the larger the number of load MOS transistors 104 that are turned off and correspond to the line. Thus, the voltage drop of the GND line 117 is small, while electric current flowing through each of the load MOS transistors 104 and 105 is increased. Consequently, the gate-source potential-difference of each of the amplifying MOS transistors 205 and 215 is increased. In the case of the configuration in which no reference pixels 101 are provided, the gate-source potential-difference of the amplifying MOS transistor 205 is increased. Thus, a line containing the effective pixels 100, on each of which intense light is incident, differs in output range of photoelectric conversion signals from another line containing no such effective pixels. Consequently, in an image upon which intense spot light is incident, sometimes, horizontal smears occur, in which whitish bands are generated on both of lateral sides of a spot.

The present exemplary embodiment is configured to include the reference pixels 101, and to electrically connect the second vertical signal line 103 via the load MOS transistor 105 to the common gate line 116 and the GND line 117. With this configuration, the source-gate potential-difference of the amplifying MOS transistor 205 of the effective pixel 100 is increased when intense incident light is incident upon the effective pixels 100. Similarly, the source-gate potential-difference of the amplifying MOS transistor 215 of the reference pixel 101 is increased. The S signal output from the differential amplifier 112 represents a difference between the photoelectric conversion signal and the reference signal. Thus, the influence of the increase of the source-gate potential-difference of each of the amplifying MOS transistors 205 and 215 may be subtracted. Accordingly, occurrence of horizontal smears may be suppressed.

Figure 3B:
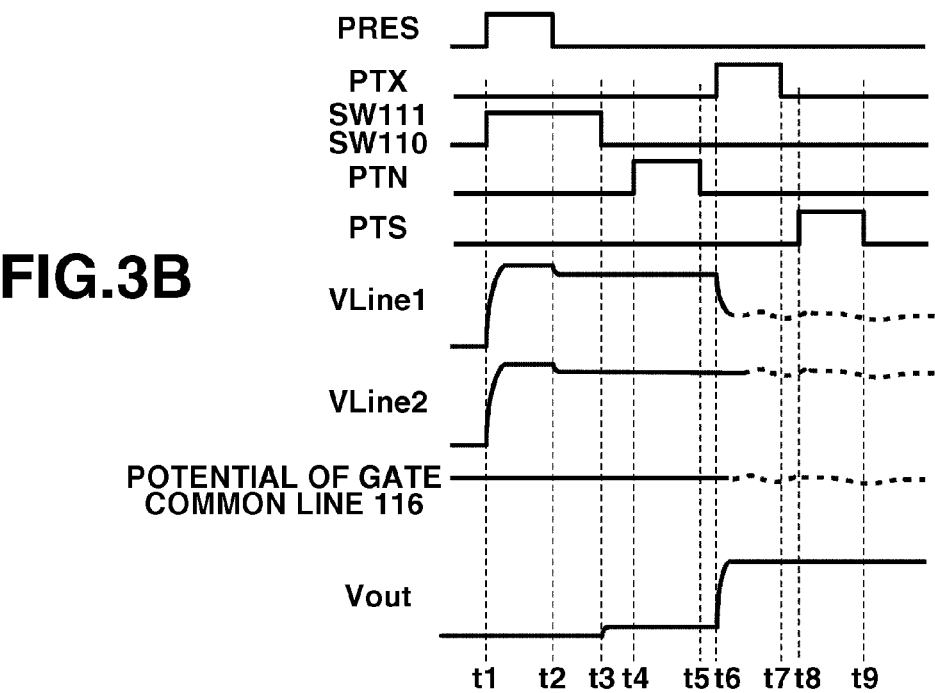

In addition, it is described hereinafter that the present exemplary embodiment may suppress lateral stripes, which cause image quality degradation, similarly to the horizontal smears. FIG. 3B is a timing chart illustrating a case where the electric-potential level of the common gate line 116 varies. FIG. 3B is the same as FIG. 3A except the electric-potential levels VLine1 and VLine2. Variation of the electric-potential level of the common gate line 116, which is indicated by a dashed line, is caused due to random noise generated from the power supply circuit that supplies a voltage to the common gate line 116, and kickback noise generated from other circuits. If no reference pixels 101 are provided in the imaging device, electric current flowing through the load MOS transistor 104 is changed by variation of the electric-potential level of the common gate line 116. The output range of the photoelectric conversion signal output from the entire line, the operation of reading of which is selected, is changed. Consequently, in an image represented using the photoelectric conversion signals whose output range is changed by the variation of the electric-potential level of the common gate line 116, a lateral stripe is generated due to a difference in the levels of signals respectively output from a line in which the variation of the electric-potential level is caused and another line in which the variation of the electric-potential level is not caused.

With the configuration of the present exemplary embodiment, when the variation of the electric-potential level of the common gate line 116 occurs, influence of the variation on the load MOS transistor 104 is the same as that of the variation on the load MOS transistor 105. Thus, as illustrated in FIG. 3B, variations of the electric-potential levels VLine1 and VLine2, which are caused by variation of the electric-potential level of the common gate line 116, are the same as each other. Each of the N signal and the S signal output from the differential amplifier 112 is a difference between a signal output from the effective pixel 100 and the reference signal. Therefore, the influence of the variation of the electric-potential level of the common gate line 116 may be subtracted. Accordingly, even in a case where the variation of the electric-potential level of the common gate line 116 occurs, there is a difference in the output range of a photoelectric conversion signal between a line in which the variation of the electric-potential level is not caused and another line in which the variation of the electric-potential level is caused. Thus, a lateral stripe may be suppressed from occurring on the obtained image.

According to the present exemplary embodiment, in order to reduce horizontal smears and lateral stripes, which are problematic in an image output by the solid-state imaging device, the load MOS transistors 104 and 105 are connected to the common gate line 116 and the common GND line 117. However, apparently, in view of an advantage of the embodiments in that the parameters for the amplifying transistors may be set independent of the differential amplifying unit, the solid-state imaging device may be configured such that the load MOS transistors 104 and 105 are connected neither to the common gate line 116 nor to the common GND line 117, and that the load MOS transistors 104 and 105 are respectively connected to different gate lines and to different GND lines. Thus, it is sufficient that the differential amplifiers 112 and the amplifying MOS transistors 205 and 215 are provided separately from one another.

The reset operation to be performed between time t1 and time t2 is to reset the electric-potential levels of the FD regions 203 and 213. However, the reset operation may be adapted to set the level of the pulse PTX at H-level and to reset the electric-potential levels of the photodiode 201 and the capacitor 211. In this case, it is useful to perform photoelectric conversion at the photodiode 201 between time t2, at which the levels of the pulses PRES and PTX are set to L-level, and time t6, at which the level of the pulse PTX is set to H-level.

At time t2, the reset of the FD region 213 of the reference pixel 101 is finished simultaneously with that of the FD region 203 of the effective pixel 100. However, because the photoelectric conversion is not performed by the reference pixel 101, the solid-state imaging device may be continued to give the electric-potential at the reset level to the FD region 213 without finishing the reset of the FD region 213.

It is sufficient for the switches 110 and 111 that the state of each of the switches 110 and 111 is changed from an on-state to an off-state in a time period between time t2 and time t4. That is, timing of turning on the switches 110 and 111 is not necessarily in agreement with time t1 at which the level of the pulse PRES is changed to H-level. It is sufficient that the timing of turning on the switches 110 and 111 is within a time period between time t1 and time t4.

It is useful that transfer of a photoelectric conversion signal to the differential amplifier 112 and transfer of a reference signal to the differential amplifier 112 are finished at the same time. Sometimes, the electric-current values of electric currents respectively supplied by the load MOS transistors 104 and 105 may be varied. An amount of variation of the electric-current value may depend upon time. In this case, if timing of finishing reading the photoelectric conversion signal and that of finishing reading the reference signal are made different from each other, amounts of variation of electric-current values of the load MOS transistors 104 and 105 contained in signals that are stored in the signal processing circuit 113 may differ from each other. Thus, even if the signal processing circuit 113 obtains the difference between the signals, sometimes, the influence of the variation of the electric-current value of electric current supplied by the load MOS transistors 104 and 015 may not be completely subtracted.

In the present exemplary embodiment, it has heretofore been described that the reference pixel 101 is configured to include the capacitor 211, the FD region 213, the reset MOS transistor 204. However, it is sufficient that the reference pixel 101 includes at least the amplifying MOS transistor 215 adapted to output a signal based on a voltage applied to the gate thereof. More specifically, the reference pixel 101 may be configured such that the reset MOS transistor 204 is not provided therein, that a voltage supply line is connected to the gate of the amplifying MOS transistor 215, and that the amplifying MOS transistor 215 outputs a signal based on a voltage supplied from the voltage supply line. Thus, the reference pixel 101 may be designed such that the area of the gate of the amplifying MOS transistor 215 is increased by omitting the FD region 213 serving as an electric-charge storing unit, the capacitor 211, the transfer MOS transistor 202, and the like.

It has been described that the reference pixel 101 is configured so that the capacitor 211 stores electric charge. The reference pixel 101 may have another configuration in which, e.g., the FD region 213 stores electric charge, instead of the capacitor 211 illustrated in FIG. 2. Alternatively, the reference pixel 101 may be configured to include the capacitor 211 provided separately from the FD region 213. Alternatively, the reference pixel 101 may be configured to include the photodiode 201, similarly to the effective pixel 100. If a photodiode is provided in the reference pixel 101, the reference pixel 101 is configured as an optical black pixel in which the photodiode is shielded from light. Thus, a reference output may be obtained from the reference pixel 101.

The present exemplary embodiment is not limited to a configuration in which the amplifying MOS transistor 205 of each effective pixel 100 is electrically connected to the first vertical signal line 102. The present exemplary embodiment may be configured such that the reset MOS transistor 204 and the FD region 203 are shared by a plurality of effective pixels 100. Thus, the present exemplary embodiment may be configured such that a plurality of photodiodes 201 and the FD region 203 are connected to a single amplifying MOS transistor 205.

The differential amplifiers 112 are configured to be alternately arranged at ends in a direction of each column of the pixel region 130. However, the differential amplifiers 112 may be configured to be alternately arranged not in units of one column but in units of a plurality of columns. Alternatively, the differential amplifiers 112 may be configured not to be alternately arranged, and to be arranged only on one of sides of the pixel region 130.

If the signals output from the signal processing circuit 113 are analog ones, it is useful to provide an analog-to-digital (A/D) converter for converting, into a digital signal, an analog signal output by the signal processing circuit 113. The A/D converter corresponds to an analog-to-digital conversion unit.

The present exemplary embodiment has been described based on a configuration in which each pixel includes three MOS transistors, i.e., a transfer MOS transistor, an amplifying MOS transistor, and a reset MOS transistor. The present exemplary embodiment may be configured such that each pixel further includes a selection MOS transistor. The selection MOS transistor is electrically connected to the line selection unit 210 at the gate thereof. In addition, one of the drain and the source of the selection MOS transistor is electrically connected to the first vertical signal line 102 or the second vertical signal line 103. The other of the drain and the source of the selection MOS transistor is electrically connected to the transistor 205 or the amplifying MOS transistor 215. The line selection unit 210 applies a pulse to the gate of the selection MOS transistor of a pixel that outputs a signal to the first vertical signal line 102 or the second vertical signal line 103. Accordingly, a signal output from the selected pixel is supplied to the first vertical signal line 102 or the second vertical signal line 103.

The present exemplary embodiment has been described as having a configuration in which the transistors in each pixel are MOS transistors, by way of example. However, the present exemplary embodiment is not limited thereto. The reset transistor and the transfer transistor provided in each pixel may be bipolar transistors. In addition, junction field effect transistors (JFETs) may be used as the amplifying transistors.

In the solid-state imaging device illustrated in FIG. 1, each reference pixel 101 is arranged only at an end portion at the side of the differential amplifier 112 of the pixel region 130. However, the configuration according to the present exemplary embodiment is not limited thereto. In addition, each reference pixel 101 may be provided at an end portion at the side opposite to the side of the differential amplifier 112 of the pixel region 130 across the effective-pixel region 120.

The present exemplary embodiment has been described based on a configuration in which a plurality of lines and a plurality of columns of effective pixels 100 are arranged and in which a plurality of lines of reference pixels 101 are arranged. It is sufficient that one or more lines and one or more columns of effective pixels are arranged. In addition, it is sufficient that one or more lines and one or more columns of reference pixels are arranged. Thus, the solid-state imaging device according to the present exemplary embodiment may be configured such that a single effective pixel 100 and a single reference pixel are provided. In this case, it is sufficient that a single differential amplifier 112, a single first vertical signal line 102, and a single second vertical signal line 103 are provided. According to this configuration, the area of the gate serving as the control electrode of the amplifying MOS transistor 215 of each reference pixel 101 may be increased without suppressing the area of the photoelectric conversion unit of each effective pixel 100. Accordingly, a photoelectric conversion signal having low 1/f noise may be obtained.

Figure 14:
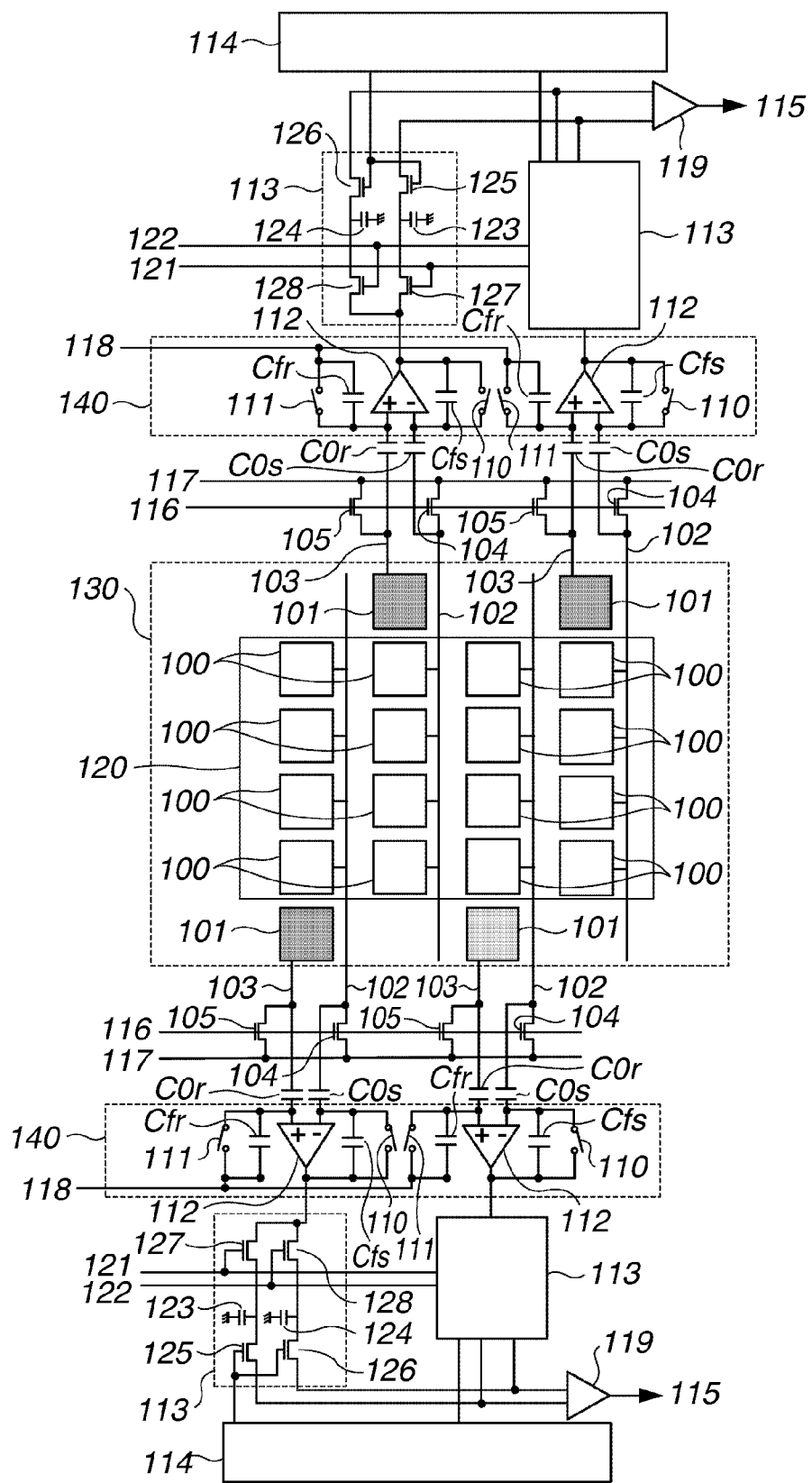
FIG. 14 is a block diagram illustrating another example according to the first exemplary embodiment.

In the present exemplary embodiment, the configuration has been described in which the signal processing circuit 113 of each column performs second CDS on signals output from the associated differential amplifier 112 thereof. A solid-state imaging device illustrated in FIG. 14 has another configuration. The solid-state imaging device illustrated in FIG. 14 is configured such that signals read in response to the pulses PTS and PTN are output to an amplifier 119, and that the amplifier 119 outputs a difference signal representing the difference between signals respectively stored in capacitors 123 and 124. That is, this configuration is such that the amplifier 119 performs the second CDS. The present exemplary embodiment has been described as having an exemplary configuration, based on the configuration performing the first CDS and the second CDS. However, the solid-state imaging device according to the present exemplary embodiment may be configured not to perform the first CDS and the second CDS. That is, it is sufficient that the solid-state imaging device according to the present exemplary embodiment has a configuration in which the differential amplifier 112 outputs a difference between the photoelectric conversion signal and the reference signal. That is, it is sufficient that the solid-state imaging device according to the present exemplary embodiment may be configured to perform neither the first CDS nor the second CDS, or to perform only one of the first CDS and the second CDS. The configuration performing only the first CDS may be such that the signal processing circuit 113 stores only the S signal output by the differential amplifier 112 without storing the N signal output by the differential amplifier 112. The configuration performing only the second CDS is considered as, e.g., a configuration in which the capacitors C0r and C0s are not provided, and in which the amplifying MOS transistors 205 and 215 are electrically connected to the differential amplifier 112, and the signal processing circuit 113 performs the second CDS on the N signal and the S signal output by the differential amplifier 112.

In the solid-state imaging device illustrated in FIG. 14, each component having the same function as a corresponding component illustrated in FIG. 1 is designated with the same reference numeral used to designate the corresponding component illustrated in FIG. 1. Thus, the description of such components is omitted. A transfer line 121 is used to transfer the pulse PTS. A transfer line 122 is used to transfer the pulse PTN. The transfer lines 121 and 122 are electrically connected to the gates of metal-oxide semiconductor field effect transistors (MOSFETs) 127 and 128, respectively. The MOSFETs 127 and 128 are electrically connected to the differential amplifier 112 and transfer signals to the capacitors 123 and 124, respectively, in response to the application of the pulses PTS and PTN. MOSFETs 125 and 126 are electrically connected to the HSR 114 at the gates thereof. When pulses are applied from the HSR 114 thereto, signals stored in the capacitors 123 and 124 are output to the amplifier 119. The amplifier 119 outputs a difference signal representing a difference between the signals respectively output from the capacitors 123 and 124. This difference signal is the signal output by the solid-state imaging device.

The solid-state imaging device illustrated in FIG. 14 may be operated at the driving timing illustrated in FIG. 3A.

The solid-state imaging devices respectively illustrated in FIGS. 1 and 14 may be configured such that as exemplified in a second exemplary embodiment with reference to FIG. 4, which are described below, a plurality of reference pixels 101 are provided at an end portion at the side of the differential amplifier 112 of the pixel region 130, and that a plurality of reference pixels 101 are connected in parallel to one another.

Similar to the solid-state imaging device illustrated in FIG. 1, the solid-state imaging device illustrated in FIG. 14 has an advantage in increase of the flexibility of setting parameters for the amplifying MOS transistors 205 and 215, as compared with the solid-state imaging device configured such that the amplifying MOS transistors serve as the input stage of the differential pair. In addition, the solid-state imaging device illustrated in FIG. 14 may suppress occurrence of horizontal smears and lateral stripes in the obtained image. The solid-state imaging device illustrated in FIG. 14 is configured such that the reference pixels 101 are provided outside the effective-pixel region 120. Accordingly, the area of the gate of the amplifying MOS transistor 215 of each reference pixel 101 may be increased without suppressing the area of the photodiode 201. Thus, the influence of 1/f noise may be reduced while a reduction of sensitivity is suppressed.

Figure 4:
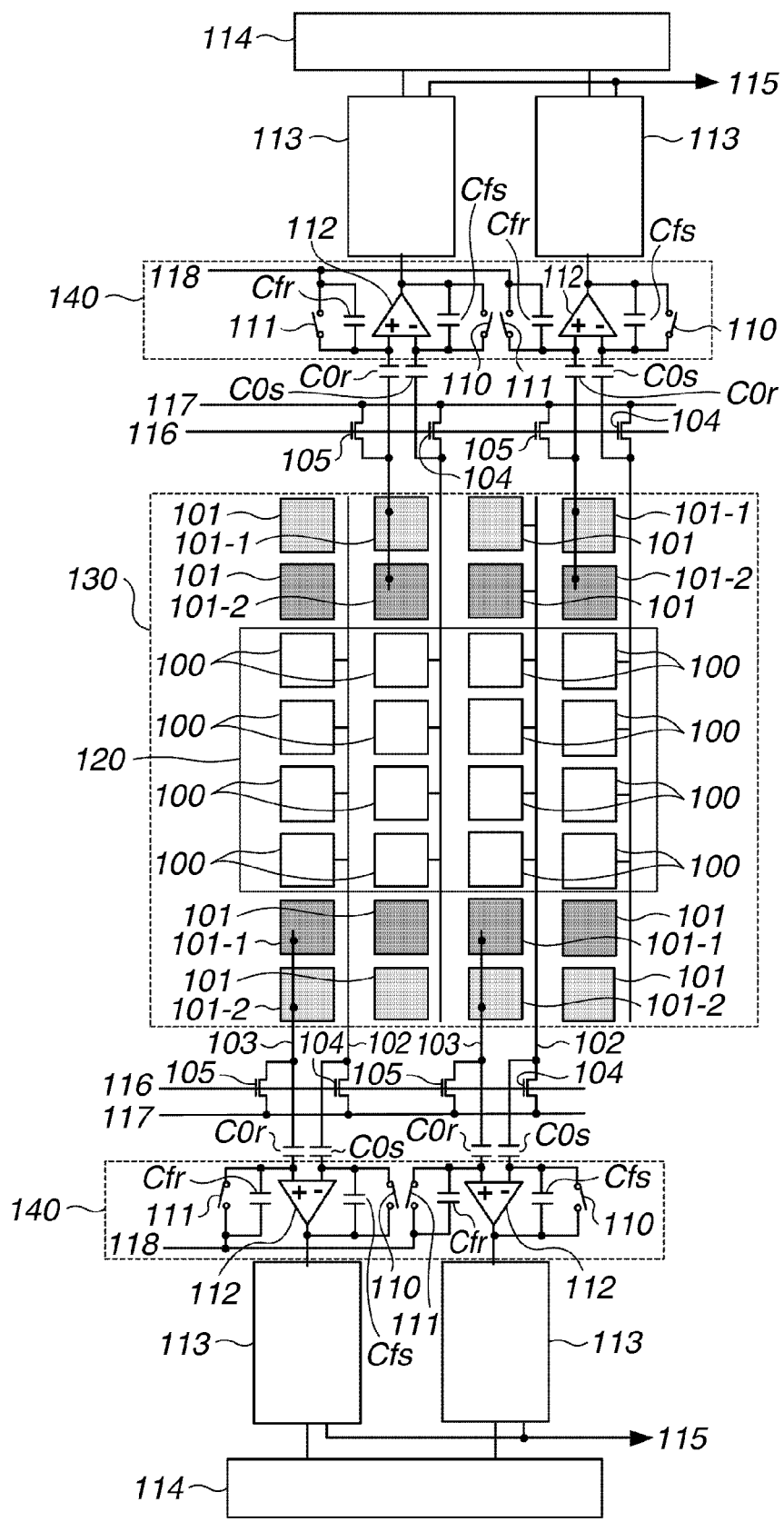
FIG. 4 is a block diagram illustrating a second exemplary embodiment.

FIG. 4 is a block diagram illustrating a second exemplary embodiment. In the solid-state imaging device illustrated in FIG. 4, each component having the same function as a corresponding component illustrated in FIG. 1 is designated with the same reference numeral used to designate the corresponding component illustrated in FIG. 1. The present exemplary embodiment has a configuration in which a plurality of reference pixels 101-1 and 101-2 are electrically connected in parallel to each other. Hereinafter, when a plurality of reference pixels are individually designated, the reference pixel 101-1 is referred to as a first reference pixel, and the reference pixel 101-2 is referred to as a second reference pixel. The reference pixels 101-1 and 101-2 are connected in parallel to the second vertical signal line 103.

Figure 5:
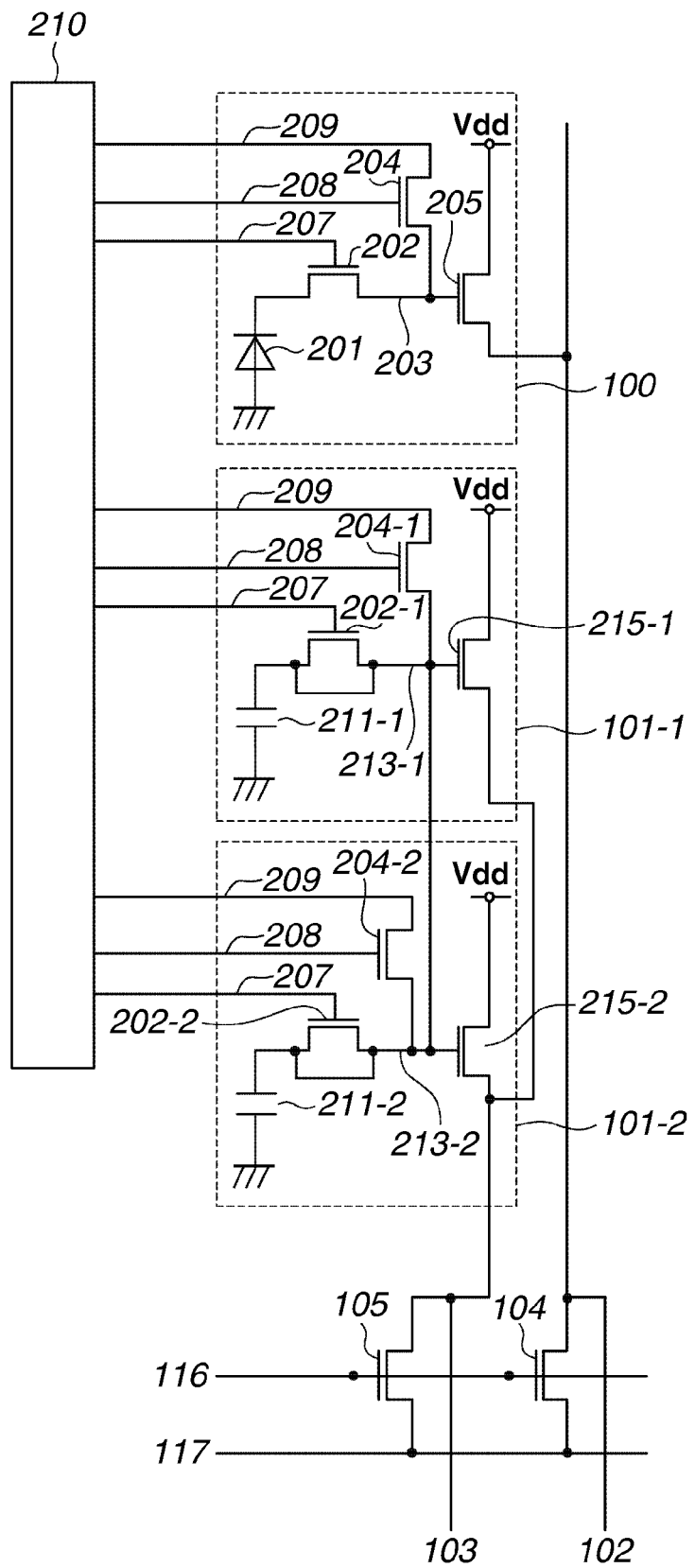
FIG. 5 is an equivalent circuit diagram illustrating the inside of a pixel according to the second exemplary embodiment.

FIG. 5 illustrates an example of an equivalent circuit diagram of a part of a circuit configuration including an effective pixel 100, a plurality of reference pixels 101-1 and 101-2, the first vertical signal line 102, and the second vertical signal line 103. In FIG. 5, each component having the same function as a corresponding component illustrated in FIG. 2 is designated with the same reference numeral used to designate the corresponding component illustrated in FIG. 2. Among components having the same function as that of corresponding components illustrated in FIG. 2, the capacitor 211, the transfer MOS transistor 202, the reset MOS transistor 204, the amplifying MOS transistor 215, and the FD region 213 of each of the first reference pixel 101-1 and the second reference pixel 101-2 are designated and distinguishably denoted by adding a suffix number to reference numeral used in FIG. 1, for convenience of description. More specifically, the amplifying MOS transistor 215 of the first reference pixel 101-1 is designated with reference numeral 215-1. The amplifying MOS transistor 215 of the second reference pixel 101-2 is designated with reference numeral 215-2. Hereinafter, the capacitors 211, the transfer MOS transistors 202, the reset MOS transistors 204, and the FD regions 213 of a plurality of reference pixels 101-1 and 101-2 are designated similarly.

The solid-state imaging device according to the present exemplary embodiment has a configuration in which the amplifying MOS transistors 205 and 215 are provided separately from the differential amplifier 112. Accordingly, the solid-state imaging device according to the present exemplary embodiment has an advantage in increase of the flexibility of setting parameters for the amplifying MOS transistors 205 and 215, as compared with the solid-state imaging device configured such that the amplifying MOS transistors serve as the input stage of the differential pair.

The solid-state imaging device according to the present exemplary embodiment also has a configuration in which the gates of amplifying MOS transistors 215-1 and 215-2 of a plurality of reference pixels 101-1 and 101-2 are electrically connected to each other via FD regions 213-1 and 231-2. Consequently, the area of the gate of the amplifying MOS transistor 215 of the reference pixel 101 may be increased in a pseudo manner. Thus, 1/f noise generated in the amplifying MOS transistor of the reference pixel may be reduced by increasing the area of the gate thereof in a pseudo manner.

It is useful that each line electrically connecting the reference pixels 101-1 and 101-2 is not included in the region in which the effective pixels 100 are arranged, and exists in the reference pixel region in which a plurality of reference pixels 101-1 and 101-2 are arranged. With this configuration, the reference pixel 101 does not suppress the area of the photodiode 201 of each effective pixel 100.

The present exemplary embodiment has a configuration in which two reference pixels are provided and the gates of the two amplifying MOS transistors are electrically connected to each other. However, the configuration according to the present exemplary embodiment is not limited thereto. The present exemplary embodiment may have another configuration in which three or more reference pixels are arranged and the gates of the amplifying MOS transistors 215 of the reference pixels are electrically connected to one another. In this case, the area of the gate of the amplifying MOS transistor 215 of the reference pixel 101 may be increased in a pseudo manner, as compared with the configuration in which the two amplifying MOS transistors are electrically connected to each other. Consequently, 1/f noise may be more reduced.

The configuration according to the present exemplary embodiment is not limited to that in which the amplifying MOS transistors 205 of each effective pixel 100 is electrically connected to the first vertical signal line 102. The present exemplary embodiment may have a configuration in which the reset MOS transistor 204 and the FD region 203 are shared by a plurality of effective pixels 100, i.e., a configuration in which a plurality of photodiodes 201 and FD regions 203 are connected to a single amplifying MOS transistor 205.

Figure 6:
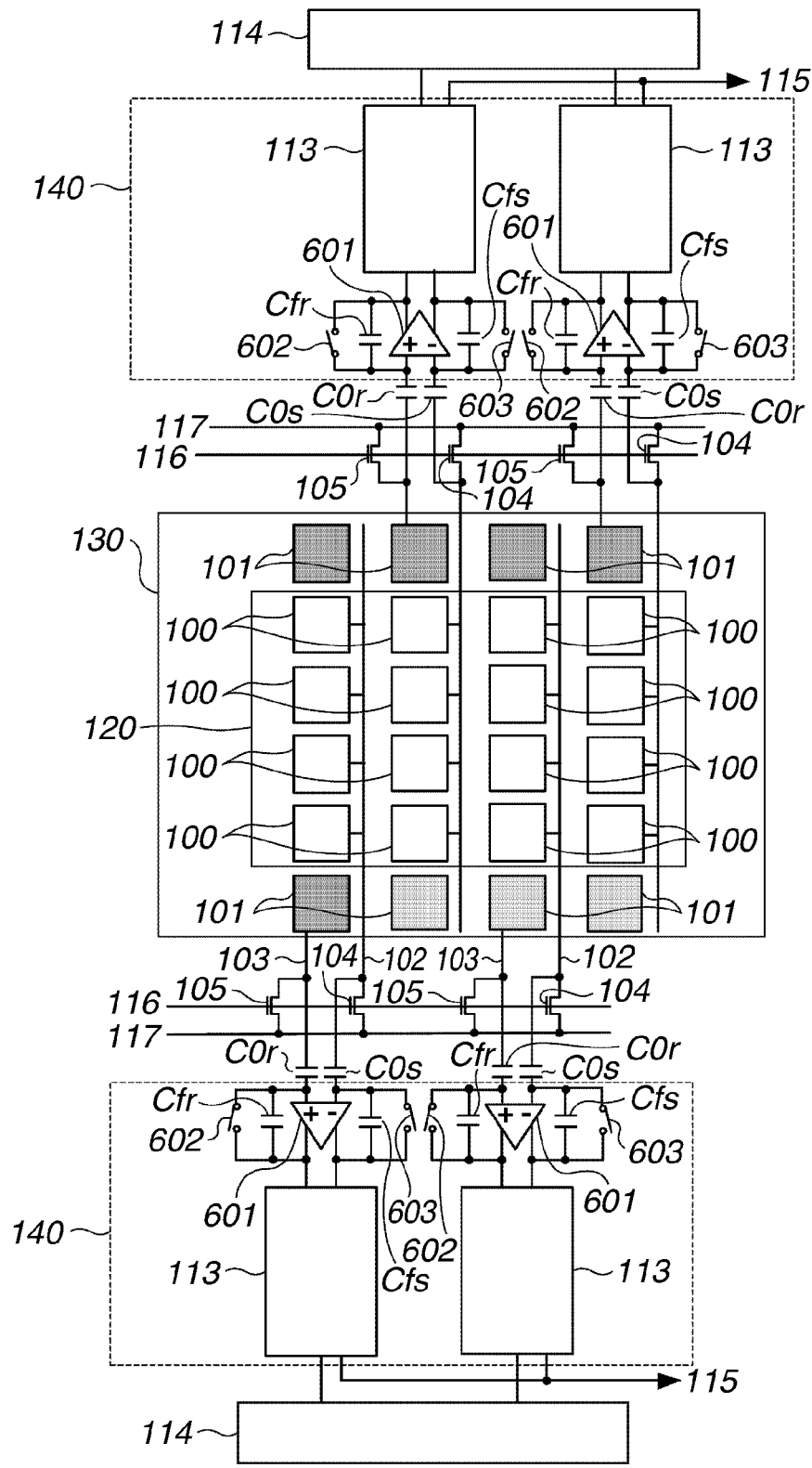
FIG. 6 is a block diagram illustrating a third exemplary embodiment.

FIG. 6 is a block diagram illustrating a third exemplary embodiment.

In the solid-state imaging device illustrated in FIG. 6, each component having the same function as that of a corresponding component illustrated in FIG. 1 is designated with the same reference numeral used to designate the corresponding component illustrated in FIG. 1. Thus, the description of such components is omitted.

As illustrated in FIG. 6, the states of conduction and non-conduction between an input terminal and an output terminal of a differential amplifier 601 are switched using switches 602 and 603. When the switches 602 and 603 are brought into a conduction state, capacitors Cfr and Cfs are reset. A differential amplifier is provided in each signal processing circuit 113 separately from the differential amplifier 601. Each output from the differential amplifier 601 is connected to the differential amplifier of the signal processing circuit 113. Signal difference processing based on a reference signal output by the differential amplifier 601 and a signal output from each effective pixel 100 may be implemented by the differential amplifier provided in the signal processing circuit 113. The signal processing circuit 113 may perform both of the difference processing and other types of processing such as correction. Thus, the difference signal output unit 140 according to the present exemplary embodiment is configured to include the differential amplifier 601 and the signal processing circuit 113.

An operation of the solid-state imaging device illustrated in FIG. 6 according to the present exemplary embodiment may be implemented similar to the operation illustrated in FIGS. 3A and 3B. Operations of the switches 602 and 603 may be implemented similar to the operations of the switches 110 and 111 illustrated in FIGS. 3A and 3B. The solid-state imaging device according to the present exemplary embodiment may be configured without being provided with the reference voltage line 118 of the differential amplifier 112 illustrated in FIG. 1.

The solid-state imaging device according to the present exemplary embodiment has a configuration in which the amplifying MOS transistors 205 and 215 are provided separately from the differential amplifier 601. Accordingly, the solid-state imaging device according to the present exemplary embodiment has an advantage in increasing the flexibility of setting parameters for the amplifying MOS transistors 205 and 215, as compared with the solid-state imaging device having a configuration in which the amplifying MOS transistors serve also as MOS transistors of the input stage of the differential pair.

The solid-state imaging device illustrated in FIG. 6 is configured so that the differential amplifier 601 differentially amplifies outputs of the effective pixel 100 and the reference pixel 101, and outputs the differentially-amplified outputs. Thus, an input corresponding to each column to the signal processing circuit 113 serves as a differential amplification input. Noise generated at the differential amplifier 601 or at a portion closer to the signal processing circuit 113 than the differential amplifier 601 is superposed on an output of each of the effective pixels 100 and the reference pixels 101. Thus, the difference between the outputs of the effective pixel 100 and the reference pixel 101 is obtained by the signal processing circuit 113. Consequently, the noise generated at the differential amplifier 601 and at the portion closer to the signal processing circuit 113 than the differential amplifier 601 may be subtracted from the output. Thus, the present exemplary embodiment has an advantage in reducing noise contained in the signal 115 output from the solid-state imaging device.

The signal processing circuit 113 may perform the second CDS on the reference signal and a signal output from the effective pixel 100. When the electric-current value of electric current supplied from the load MOS transistors 104 and 105 varies, the reference signal varies with the variation of the electric-current value. An amount of variation of the reference signal due to the variation of the electric-current value of electric current supplied by the load MOS transistors 104 and 105 may be obtained by causing the signal processing circuit 113 to perform the second CDS on the reference signal. In addition, a signal obtained by subtracting noise generated at the effective pixel 100 from the photoelectric conversion signal maybe obtained by causing the signal processing circuit 113 to also perform the second CDS on the signal output from the effective pixel 100. Then, the amount of variation of the reference signal obtained by performing the second CDS is subtracted from the signal obtained by performing the second CDS on the signal output from the effective pixel 100. Consequently, influence of the variation of the load MOS transistors 104 and 105 may be subtracted from the photoelectric conversion signal.

The difference signal output unit 140 according to the present exemplary embodiment includes the differential amplifier 601 and the signal processing circuit 113. The present exemplary embodiment may have another configuration in which a differential amplifier 129 electrically connected to the signal processing circuit 113 is provided in the differential signal output unit 140. In this case, a signal based on an output from an inverting amplifier 701 (see FIG. 15) and another signal based on an output of another inverting amplifier 702 (see FIG. 15) are respectively output to the differential amplifier 129 by the signal processing circuit 113. Then, a signal representing the difference between the signals output by the signal processing circuit 113 is obtained by the differential amplifier 129. In the case of this configuration, an output signal from the difference amplifier 129 is the signal 115 output by the solid-state imaging device.

The solid-state imaging device according to the present exemplary embodiment may reduce noise generated at the differential amplifier 601 and at the portion closer to the signal processing circuit 113 than the differential amplifier 601. Consequently, the solid-state imaging device according to the present exemplary embodiment may obtain a low-noise good image.

As described in the second exemplary embodiment with reference to FIG. 4, the solid-state imaging device according to the present exemplary embodiment may have a configuration in which a plurality of reference pixels 101 are provided at an end portion at the side of the differential amplifier 601 of the pixel region 130 and connected in parallel to one another.

The configuration according to the present exemplary embodiment is not limited to that in which the amplifying MOS transistors 205 of each effective pixel 100 are electrically connected to the first vertical signal line 102. The present exemplary embodiment may be configured such that the reset MOS transistor 205 and the FD region 203 are shared by a plurality of effective pixels 100. Thus, the configuration according to the present exemplary embodiment may be such that a plurality of photodiodes 201 and FD regions 203 are connected to a single amplifying MOS transistor 205.

Figure 15:
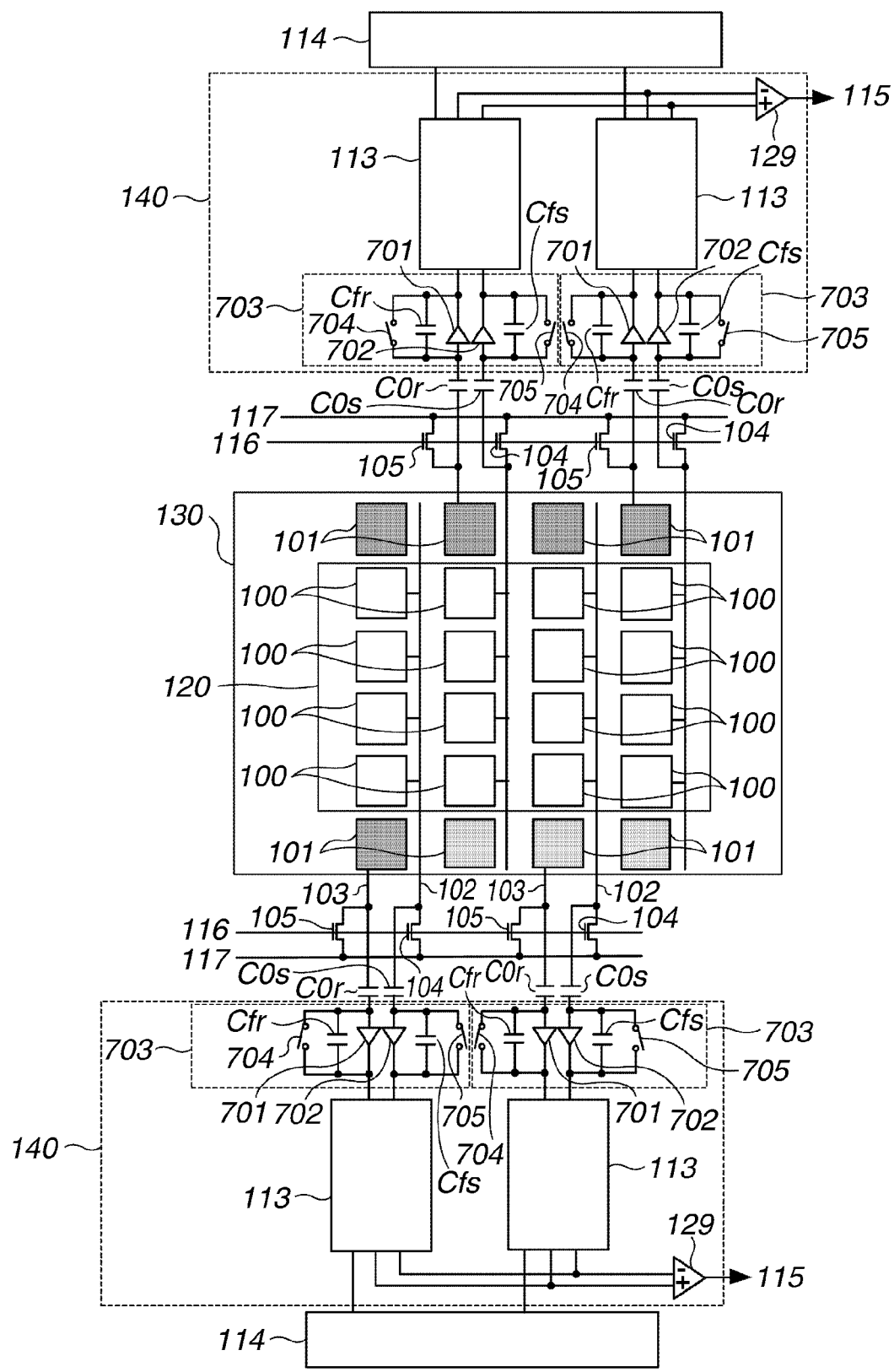
FIG. 15 is a block diagram illustrating another example according to the third exemplary embodiment.

Alternatively, the present exemplary embodiment may be configured without providing a differential amplifier in the inside of the signal processing circuit 113 such that as illustrated in FIG. 15, signals from the inverting amplifiers 701 and 702 are individually subjected to signal processing and resultant signals are output to the differential amplifier 129 provided in common to a plurality of columns. According to this configuration, the difference signal output unit 140 is configured to include the inverting amplifiers 701 and 702, the signal processing circuit 113, and the differential amplifier 129.

Figure 7:
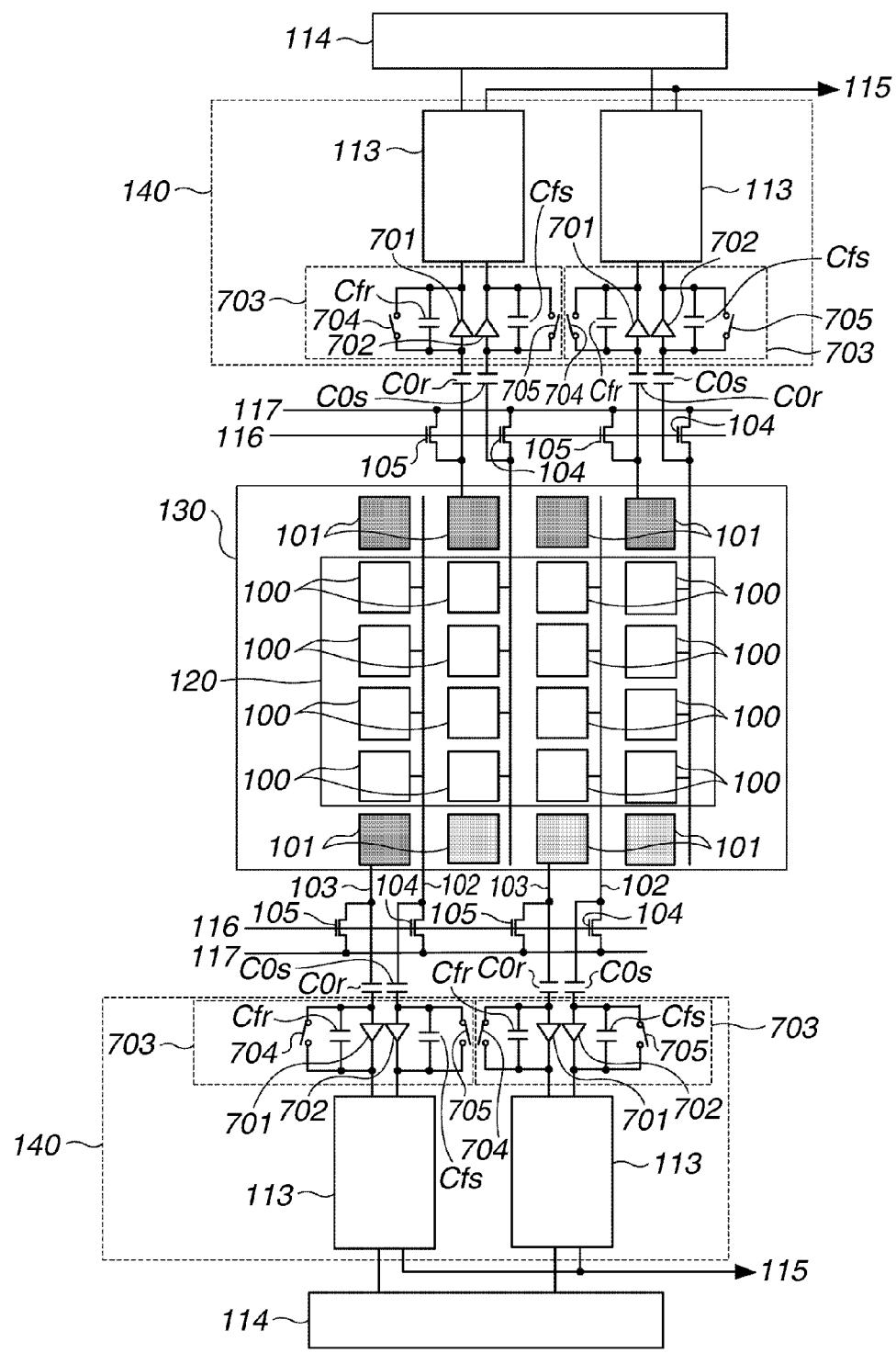
FIG. 7 is a block diagram illustrating a fourth exemplary embodiment.

FIG. 7 is a block diagram illustrating a fourth exemplary embodiment. In the solid-state imaging device illustrated in FIG. 7, each component having the same function as a corresponding component illustrated in FIG. 1 is designated with the same reference numeral used to designate the corresponding component illustrated in FIG. 1. Thus, the description of such components is omitted.

The inverting amplifiers 701 and 702 illustrated in FIG. 7 correspond to a first amplifying unit and a second amplifying unit, respectively. The inverting amplifiers 701 and 702 constitute an amplifying circuit 703 using a common voltage supply and a current source. It is useful that the inverting amplifiers 701 and 702 are arranged adjacent to each other so that the ranges of the signal-levels of signals respectively output by the inverting amplifiers 701 and 702 are the same as much as possible. For example, the configuration of a source-grounded circuit may be considered as that of each of the inverting amplifiers 701 and 702.

Each of switches 704 and 705 is configured to switch whether the input terminal and the output terminal of an associated one of the inverting amplifiers 701 and 702 are short-circuited. When the switches 704 and 705 are brought into a conduction state, electric charge stored in the capacitors Cfr and Cfs is discharged and reset.

The solid-state imaging device illustrated in FIG. 7 is such that the inverting amplifier 701 inversion-amplifies the reference signal output from the reference pixel 101, and that then, the inverting amplifier 701 outputs the inversion-amplified signal to the signal processing circuit 113. On the other hand, the inverting amplifier 702 inversion-amplifies the reference signal output from the effective pixel 100, and that then, the inverting amplifier 701 outputs the inversion-amplified signal to the signal processing circuit 113.

The inverting amplifiers 701 and 702 inversion-amplify signals respectively output from the effective pixel 100 and the reference pixel 101. Then, the inverting amplifiers 701 and 702 output the inversion-amplified signals to the signal processing circuit 113. A differential amplifier is provided in the signal processing circuit 113. Outputs of the inverting amplifiers 701 and 702 are connected to the differential amplifier of the signal processing circuit 113. The difference processing of signals respectively output by the inverting amplifiers 701 and 702 is implemented by the differential amplifier provided in the signal processing circuit 113. The signal processing circuit 113 may implement the difference between the signals respectively output by the inverting amplifiers 701 and 702 and perform other types of processing such as correction. The difference signal output unit 140 according to the present exemplary embodiment is configured to include the inverting amplifiers 701 and 702 and the signal processing circuit 113.

An operation of the solid-state imaging device illustrated in FIG. 7 according to the present exemplary embodiment may be implemented similar to the operation illustrated in FIGS. 3A and 3B. Operations of the switches 704 and 705 may be implemented similar to the operations of the switches 110 and 111 illustrated in FIGS. 3A and 3B.

The solid-state imaging device according to the present exemplary embodiment has a configuration in which the amplifying MOS transistors 205 and 215 are provided separately from the inverting amplifiers 701 and 702. Accordingly, the solid-state imaging device according to the present exemplary embodiment has an advantage in increasing the flexibility of setting parameters for the amplifying MOS transistors 205 and 215, as compared with the solid-state imaging device having a configuration in which the amplifying MOS transistors serve also as MOS transistors of the input stage of the differential pair.

The solid-state imaging device illustrated in FIG. 7 is configured such that outputs of the effective pixel 100 and the reference pixel 101 are inversion-amplified by the inverting amplifiers 701 and 702, respectively. Thus, the input to the signal processing circuit 113 corresponding to each column is a differential amplification input. Noise generated at the inverting amplifiers 701 and 702 or at a portion closer to the signal processing circuit 113 than the inverting amplifiers 701 and 702 is superimposed on outputs of the effective pixel 100 and the reference pixel 101. Thus, the difference between signals respectively output by the inverting amplifiers 701 and 702 is obtained by the signal processing circuit 113. Consequently, noise generated at the inverting amplifiers 701 and 702 and at the portion closer to the signal processing circuit 113 than the inverting amplifiers 701 and 702 may be subtracted. Accordingly, the solid-state imaging device illustrated in FIG. 7 has an advantage in reducing noise contained in the signal 115 output by the solid-state imaging device.

The present exemplary embodiment may be configured not to be provided with the reference voltage line 118 of the differential amplifier 112 illustrated in FIG. 1.

The signal processing circuit 113 may perform the second CDS on the reference signal and a signal output from the effective pixel. When the electric-current value of electric current supplied from the load MOS transistors 104 and 105 varies, the reference signal varies with the variation of the electric-current value. The amount of variation of the reference signal due to the variation of the electric-current value of electric current supplied from the load MOS transistors 104 and 105 may be obtained by causing the signal processing circuit 113 to perform the second CDS. A signal representing a result of subtracting noise generated at the effective pixel 100 from the photoelectric conversion signal may be obtained by also performing the second CDS on the signal output from the effective pixel 100. In addition, the amount of variation of the reference signal obtained by performing the second CDS is subtracted from the signal obtained by performing the second CDS on the signal output from the effective pixel 100. Consequently, influence of the variation of the load MOS transistors 104 and 105 may be subtracted from the photoelectric conversion signal.

The difference signal output unit 140 according to the present exemplary embodiment includes the inverting amplifiers 701 and 702 and the signal processing circuit 113. The present exemplary embodiment may have another configuration in which a differential amplifier electrically connected to the signal processing circuit 113 is provided in the differential signal output unit 140. In this case, the signal processing circuit 113 outputs a signal based on an output of the inverting amplifier 701 and a signal based on an output of the inverting amplifier 702 individually to the differential amplifier. Alternatively, the present exemplary embodiment may be configured such that the difference between two signals output by the signal processing circuit 113 is obtained by the differential amplifier. In the case of this configuration, an output signal from the differential amplifier is the signal 115 output by the solid-state imaging device.

The solid-state imaging device according to the present exemplary embodiment may reduce noise generated at the inverting amplifiers 701 and 702 and at a portion closer to the signal processing circuit 113 than the inverting amplifiers 701 and 702. Consequently, the solid-state imaging device according to the present exemplary embodiment may obtain a low-noise good image.

As described in the second embodiment with reference to FIG. 4, the solid-state imaging device according to the present exemplary embodiment may have a configuration in which a plurality of reference pixels 101 are provided at an end portion at the side of the inverting amplifiers 701 and 702 of the pixel region 130 and electrically connected in parallel to one another.

The configuration according to the present exemplary embodiment is not limited to that in which the amplifying MOS transistors 205 of each effective pixel 100 are electrically connected to the first vertical signal line 102. The present exemplary embodiment may be configured such that the reset MOS transistor 205 and the FD region 203 are shared by a plurality of effective pixels 100. Thus, the configuration according to the present exemplary embodiment may be such that a plurality of photodiodes 201 and FD regions 203 are connected to a single amplifying MOS transistor 205.

Alternatively, the present exemplary embodiment may be configured without providing a differential amplifier in the inside of the signal processing circuit 113 such that as illustrated in the above third exemplary embodiment with reference to FIG. 15, a differential amplifier is not provided in the signal processing circuit 113. Signals from the inverting amplifiers 701 and 702 are individually subjected to signal processing and resultant signals are output to the differential amplifier 129 provided in common to a plurality of columns. According to this configuration, the difference signal output unit 140 is configured to include the inverting amplifiers 701 and 702, the signal processing circuit 113, and the differential amplifier 129.

Figure 8:
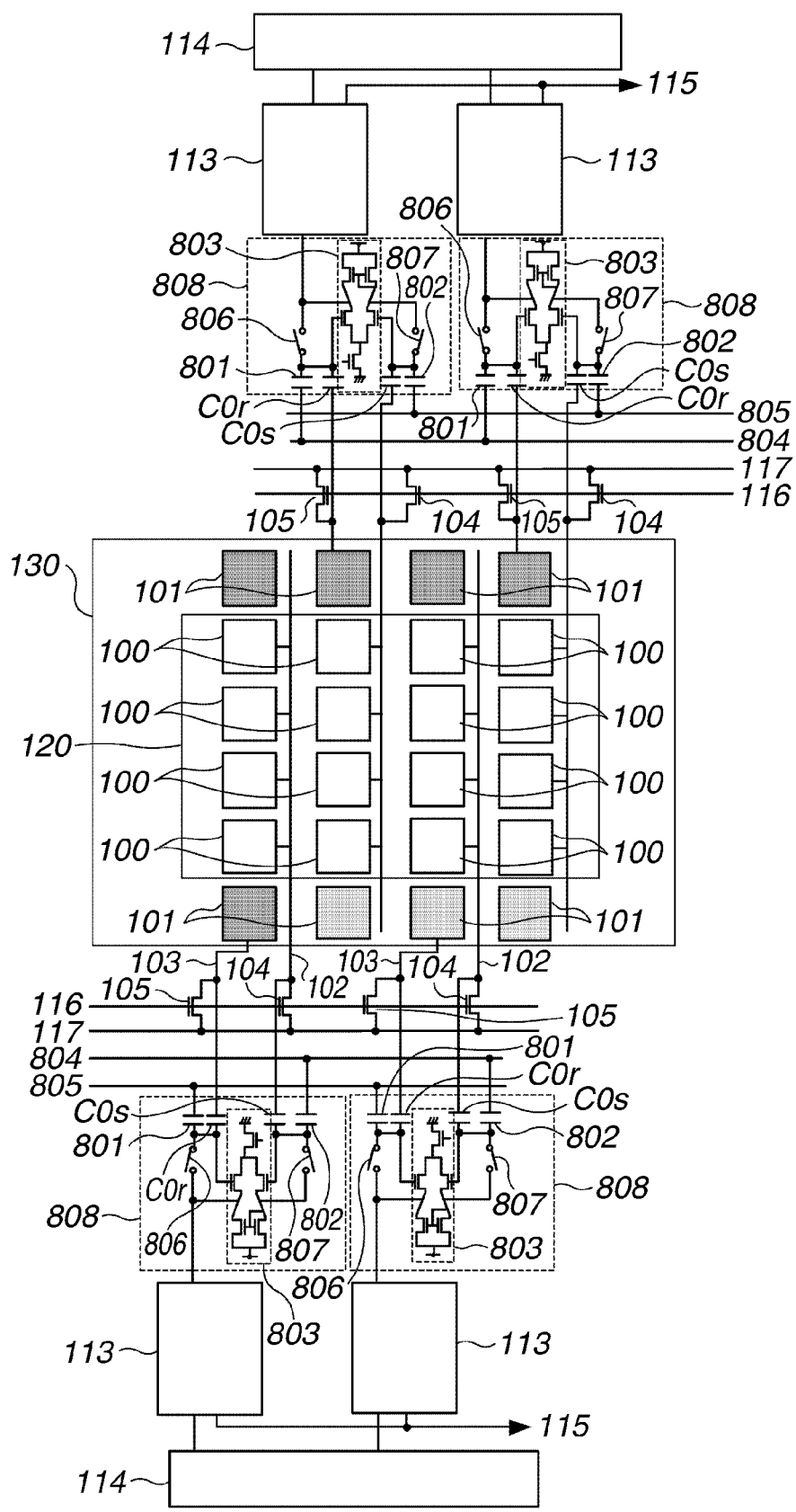
FIG. 8 is a block diagram illustrating a fifth exemplary embodiment.
Figure 9:
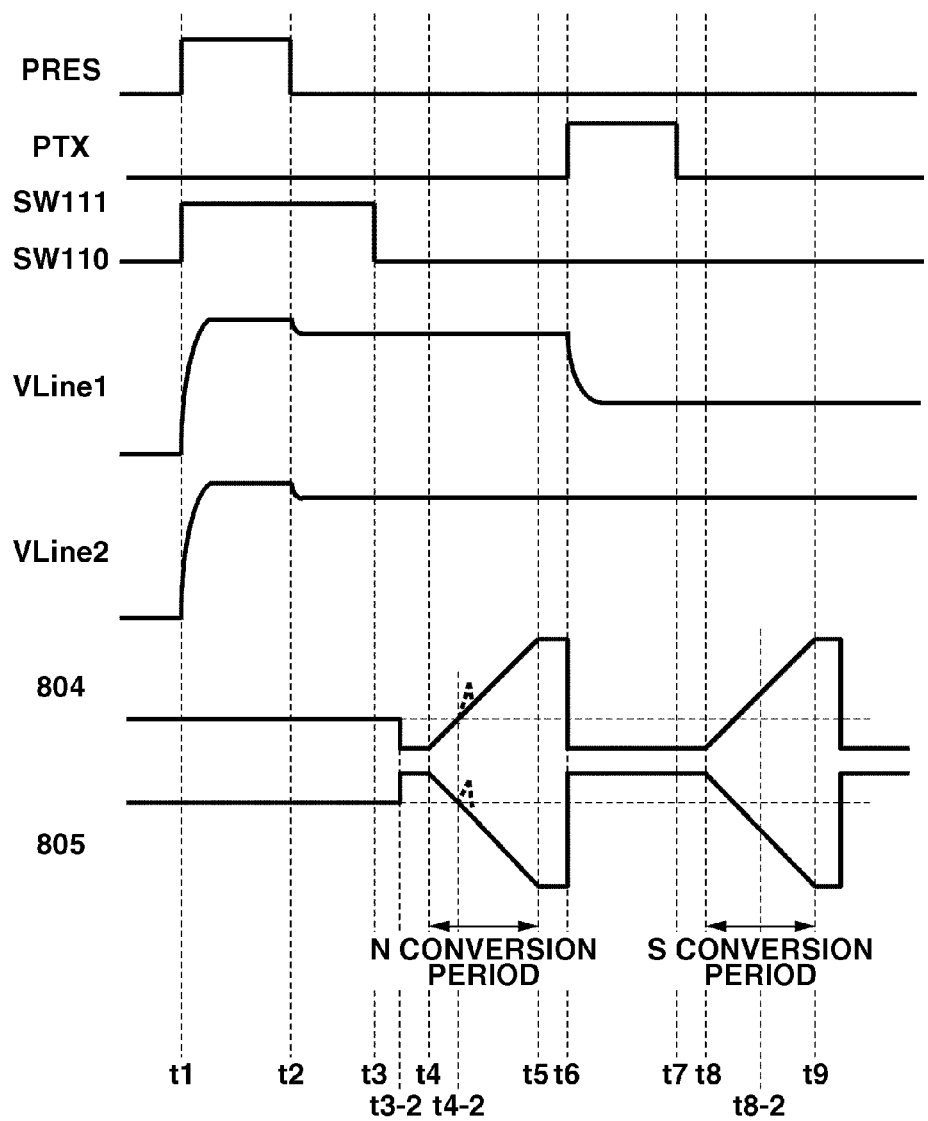
FIG. 9 is a timing chart illustrating a driving method according to the fifth exemplary embodiment.

FIG. 8 is a block diagram illustrating a fifth exemplary embodiment. FIG. 9 is a timing chart illustrating an example of an operation of the fifth exemplary embodiment.

In the solid-state imaging device illustrated in FIG. 8, each component having the same function as that of a corresponding component illustrated in FIG. 1 is designated with the same reference numeral used to designate the corresponding component illustrated in FIG. 1. Thus, the description of such components is omitted. The solid-state imaging device illustrated in FIG. 8 includes capacitors 801 and 802, a comparator 803, ramp lines 804 and 805, and switches 806 and 807. The reset of the capacitors in a comparison circuit 808 is performed by making each of the switches 806 and 807 conductive.

Hereinafter, a driving method for the solid-state imaging device according to the present exemplary embodiment is described with reference to a timing chart illustrated in FIG. 9. Reference numerals described in FIG. 9 correspond to those assigned to components in the solid-state imaging device illustrated in FIG. 8. The timing chart illustrated in FIG. 9 is similar to that illustrated in FIG. 3 except for the ramp lines 804 and 805.

Hereinafter, an operation of the solid-state imaging device illustrated in FIG. 8 is described with reference to a timing chart illustrated in FIG. 9.

After the level of the pulse PRES becomes L-level at time t2, the switches 110 and 111 are turned off. At that time, a signal representing the difference between the offset voltage of the comparator 803 and the electric-potential level of the first vertical signal line 102 is stored in the capacitors C0s and 802, while a signal representing the difference between the offset voltage of the comparator 803 and the electric-potential level of the second vertical signal line 103 is stored in the capacitors C0r and 801.

At time t3-2, the electric-potential level of each of the ramp lines 804 and 805 is changed to level Vref from the reset electric-potential level at which the comparison circuit 808 is reset. Then, at time t4, the level of the pulse PTN is changed to H-level. Simultaneously with this, a ramp operation of chronologically changing the electric-potential level of each of the ramp lines 804 and 805 is started. An N conversion signal is a signal representing an A/D conversion result obtained based on a duration between time t4, at which the ramp operation is started, and time t4-2, at which the electric-potential level of each of the ramp lines 804 and 805 reaches the reset electric-potential level due to the ramp operation.

At time t5, the variation of the electric-potential level of each of the ramp lines 804 and 805 is stopped. Thus, an operation in an N conversion period is ended.

Next, at time t6, the electric-potential level of each of the ramp lines 804 and 805 is changed to the electric-potential level in a time-period between time t3-2 and time t4. In addition, at time t6, the level of the pulse PTX is changed to H-level. Then, at time t7, the level of the pulse PTX is changed to L-level. Thus, a photoelectric conversion signal is supplied to the input terminal of the comparator 803 via the capacitor C0s.

Next, at time t8, an operation in an S conversion period is started. From time t8, a ramp operation of changing the electric-potential level of each of the ramp lines 804 and 805 is performed similar to the A/D conversion at the above reset.

Then, at time t8-2, an output of the comparator 803 is changed. An S conversion signal is a signal representing an A/D conversion result obtained based on a duration between time t8, at which the ramp operation is started, and time t8-2, at which the level of the output of the comparator 803 changes.

The signal processing circuit 113 outputs the difference between the S conversion signal and the N conversion signal. The output of the signal processing circuit 113 is the signal 115 output by the solid-state imaging device.

The solid-state imaging device according to the present exemplary embodiment has a configuration in which the amplifying MOS transistors 205 and 215 are provided separately from the comparator 803. Accordingly, the solid-state imaging device according to the present exemplary embodiment may set parameters for the amplifying MOS transistors 205 and 215, independent of a parameter for the comparator 803.

According to the present exemplary embodiment, a differential relationship resides between the ramp lines 804 and 805 and between the first vertical signal line 102 and the second vertical signal line 103. Accordingly, even when noise indicated by a dashed line illustrated in the vicinity of time t4-2 is mixed into the signal 115 output by the solid-state imaging device, the influence of the noise on the signal 115 may be reduced.

According to the present exemplary embodiment, the signal processing circuit 113 may be configured by a digital signal processing circuit. Thus, the solid-state imaging device is hardly affected by noise, as compared with the case of configuring the signal processing circuit 113 by an analog signal processing circuit. Accordingly, the solid-state imaging device has an advantage in that lateral stripes are difficult to occur in an output image.

As described in the second embodiment with reference to FIG. 4, the solid-state imaging device according to the present exemplary embodiment may have a configuration in which a plurality of reference pixels 101 are provided at an end portion at the side of the comparator 803 of the pixel region 130 and electrically connected in parallel to one another.

The configuration according to the present exemplary embodiment is not limited to that in which the amplifying MOS transistors 205 of each effective pixel 100 are electrically connected to the first vertical signal line 102. The present exemplary embodiment may be configured such that the reset MOS transistor 205 and the FD region 203 are shared by a plurality of effective pixels 100. Thus, the configuration according to the present exemplary embodiment may be such that a plurality of photodiodes 201 and FD regions 203 are connected to a single amplifying MOS transistor 205.

Figure 10:
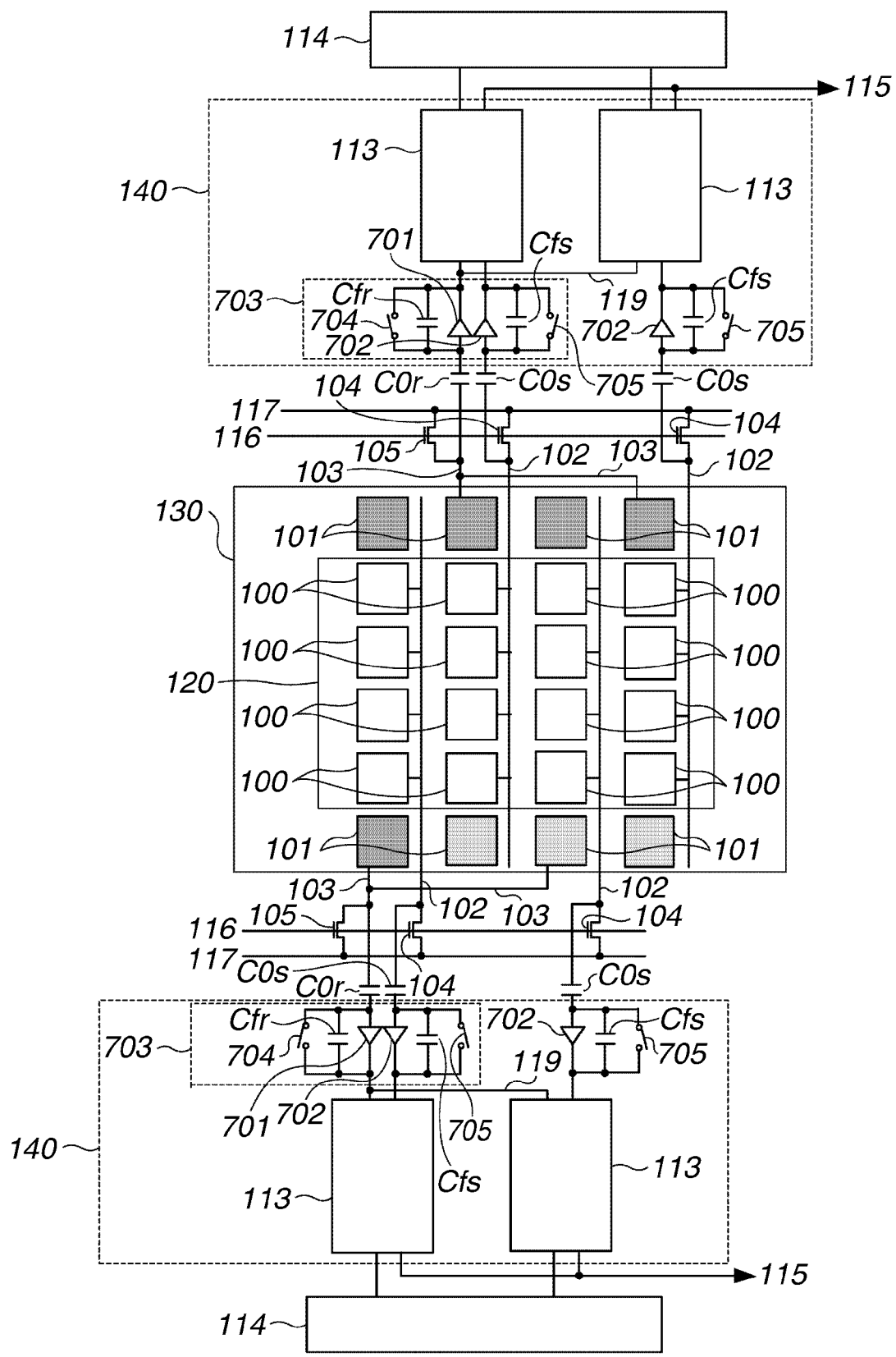
FIG. 10 is a block diagram illustrating a sixth exemplary embodiment.

FIG. 10 is a block diagram illustrating a sixth exemplary embodiment. In the solid-state imaging device illustrated in FIG. 10, each component having the same function as a corresponding component illustrated in FIG. 7 is designated with the same reference numeral used to designate the corresponding component illustrated in FIG. 7. Thus, the description of such components is omitted. Hereinafter, differences of the solid-state imaging device according to the present exemplary embodiment from that illustrated in FIG. 7 are described.

Similar to the solid-state imaging device illustrated in FIG. 7, the solid-state imaging device illustrated in FIG. 10 uses the inverting amplifiers 701 and 702 to which a common voltage supply and a current source are electrically connected. In addition, two columns of pixels use the second vertical signal line 103 in common. A signal output by the inverting amplifier 701 based on the reference signal is output to the two signal processing circuits 113. The term "two signal processing circuits 113" designates those 113 to which signals output from the effective pixels 100 of pixel columns using the second vertical signal line 103 in common are input. Similar to the fourth exemplary embodiment, the sixth exemplary embodiment is configured such that a differential amplifier is provided in each signal processing circuit 113, and that outputs from the inverting amplifiers 701 and 702 are connected to the differential amplifier of each of the signal processing circuits 113. Thus, the difference signal output unit 140 is configured to include the inverting amplifiers 701 and 702 and the signal processing circuits 113.

The pixel columns using the second vertical signal line 103 in common may be either adjacent pixel columns or those configured to sandwich pixel columns electrically connected to another second vertical signal line 103. The solid-state imaging device according to the sixth exemplary embodiment may be configured such that a part of pixel columns thereof are electrically connected to the second vertical signal line 103 common to a plurality of columns, as illustrated in FIG. 10. Alternatively, the solid-state imaging device according to the sixth exemplary embodiment may be configured such that the second vertical signal line 103 is provided in common to all of pixel columns. In the solid-state imaging device illustrated in FIG. 10, each set of two pixel columns is electrically connected to the common second vertical signal line 103. However, three or more pixel columns may be electrically connected to a common second vertical signal line 103. Because the source-drain voltage difference of the load MOS transistor 104 changes according to a change in the intensity of incident light, the reference signal may vary with the pixel columns. Thus, it is useful that pixel columns using the second vertical signal line 103 in common are pixel columns adjacent to each other.

The present exemplary embodiment has been described by describing a configuration using the inverting amplifiers 701 and 702. The configuration according to present exemplary embodiment is not limited to that using the inverting amplifiers. Differential amplifiers may be used instead of the inverting amplifiers. Alternatively, the present exemplary embodiment may be configured to use the comparison circuit 808, as described in the fifth exemplary embodiment.

The solid-state imaging device according to the present exemplary embodiment has a configuration in which the amplifying MOS transistors 205 and 215 are provided separately from the inverting amplifiers 701 and 702. Accordingly, the solid-state imaging device according to the present exemplary embodiment has an advantage in increasing the flexibility of setting parameters for the amplifying MOS transistors 205 and 215, as compared with the solid-state imaging device having a configuration in which the amplifying MOS transistors serve also as MOS transistors of the input stage of the differential pair.

The solid-state imaging device according to the present exemplary embodiment is provided with the second vertical signal line 103 common to two columns. Thus, the number of components, such as the inverting amplifiers 701, the capacitors C0r and Cfs, the switches 110, and the load MOS transistor 105, maybe reduced. In addition, it is unnecessary to arrange, on each column, the load MOS transistor 105 on the second vertical signal line 103. Consequently, consumption of electric current may be reduced.

As described in the second embodiment with reference to FIG. 4, the solid-state imaging device according to the present exemplary embodiment may have a configuration in which a plurality of reference pixels 101 are provided at an end portion at the side of each of the inverting amplifiers 701 and 702 of the pixel region 130 and electrically connected in parallel to one another.

The configuration according to the present exemplary embodiment is not limited to that in which the amplifying MOS transistors 205 of each effective pixel 100 are electrically connected to the first vertical signal line 102. The present exemplary embodiment may be configured such that the reset MOS transistor 204 and the FD region 203 are shared by a plurality of effective pixels 100. Thus, the configuration according to the present exemplary embodiment may be such that a plurality of photodiodes 201 and FD regions 203 are connected to a single amplifying MOS transistor 205.

As described in the above third exemplary embodiment with reference to FIG. 15, a differential amplifier may not be provided in the signal processing circuit 113. Signals from the inverting amplifiers 701 and 702 may be individually subjected to signal processing, and the resultant signals may be output to the differential amplifier 129 provided in common to a plurality of columns. According to this configuration, the difference signal output unit 140 is configured to include the inverting amplifiers 701 and 702, the signal processing circuit 113, and the differential amplifier 129.

Figure 11:
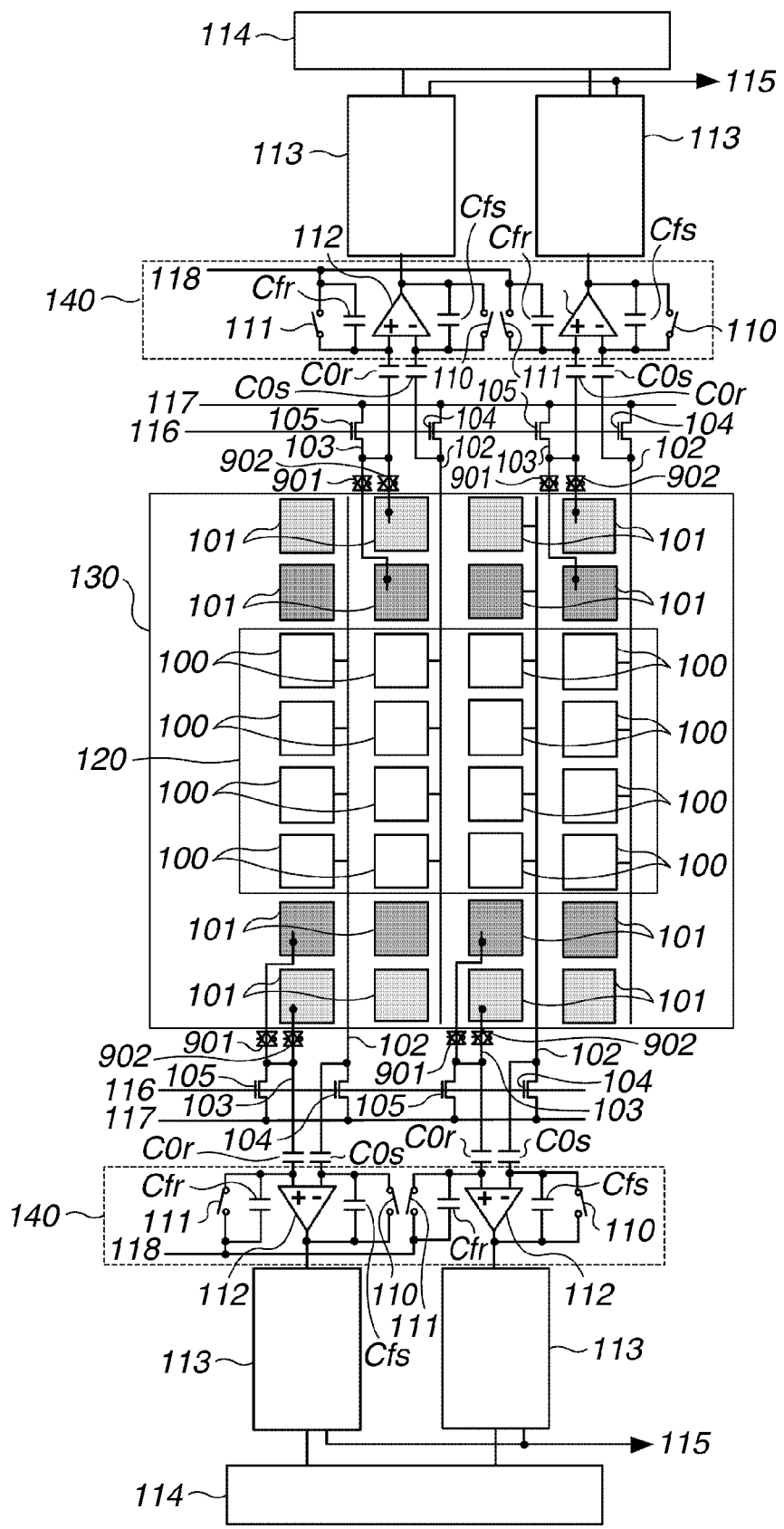
FIG. 11 is a block diagram illustrating a seventh exemplary embodiment.

FIG. 11 is a block diagram illustrating a seventh exemplary embodiment. In the solid-state imaging device illustrated in FIG. 11, each component having the same function as that of a corresponding component illustrated in FIG. 1 is designated with the same reference numeral used to designate the corresponding component illustrated in FIG. 1. Thus, the description of such components is omitted. Hereinafter, differences of the solid-state imaging device from that illustrated in FIG. 1 are described. The solid-state imaging device according to the present exemplary embodiment is such that a plurality of reference pixels 101 are arranged adjacent to an end portion of each pixel column. Among a plurality of reference pixels 101, a reference pixel to be electrically connected to the second vertical signal line 103 and the load MOS transistor 105 is selected by the switches 901 and 902.

Figure 12:
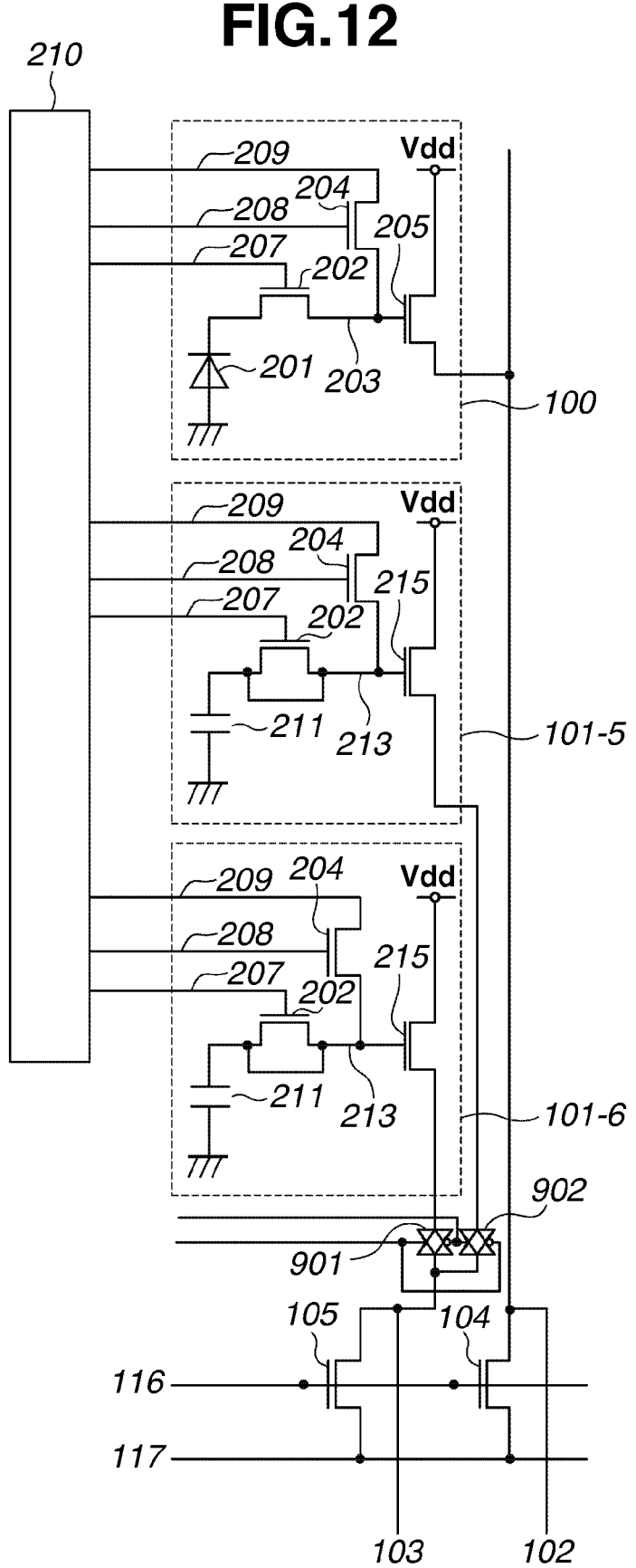
FIG. 12 is an equivalent circuit diagram illustrating the inside of a pixel according to the seventh exemplary embodiment.

FIG. 12 is an equivalent circuit diagram illustrating an example of an effective pixel 100 and a plurality of reference pixels 101 illustrated in FIG. 11. In FIG. 12, each component having the same function as that of a corresponding component illustrated in FIGS. 2 and 11 is designated with the same reference numeral used to designate the corresponding component illustrated in FIGS. 2 and 11. Thus, the description of such components is omitted.

The solid-state imaging device may be configured such that the source of the amplifying MOS transistor 215 of each of the reference pixels illustrated in FIG. 12 is electrically connected to the switch 901 or 902. The switches 901 and 902 are electrically connected to a control circuit (not illustrated) and select a reference pixel (not illustrated) that outputs a reference output to the second vertical signal line 103. Control signals for controlling operations of the switches 901 and 902 are supplied from the line selection unit 210.

In the case of a configuration in which the number of reference pixels 101 is one, when an output of a certain reference pixel 101 differs from the output of another reference pixel 101 of another column, a linear stripe occurs on a captured image. The present exemplary embodiment has a configuration in which a pixel for outputting a reference signal is selected from among a plurality of reference pixels 101. With this configuration, if a defect occurs in an output of one reference pixel 101, the output of this reference pixel is changed to an output of another reference pixel. Consequently, linear stripes occurring in a captured image may be reduced.

The solid-state imaging device according to the present exemplary embodiment has a configuration in which the amplifying MOS transistors 205 and 215 are provided separately from the differential amplifiers 112. Accordingly, the solid-state imaging device according to the present exemplary embodiment has an advantage in increasing the flexibility of setting parameters for the amplifying MOS transistors 205 and 215, as compared with the solid-state imaging device having a configuration in which the amplifying MOS transistors serve also as MOS transistors of the input stage of the differential pair.

The configuration according to the present exemplary embodiment is not limited to that in which the amplifying MOS transistors 205 of each effective pixel 100 are electrically connected to the first vertical signal line 102. The present exemplary embodiment may be configured such that the reset MOS transistor 204 and the FD region 203 are shared by a plurality of effective pixels 100. Thus, the configuration according to the present exemplary embodiment may be set such that a plurality of photodiodes 201 and FD regions 203 are connected to a single amplifying MOS transistor 205.

Figure 13:
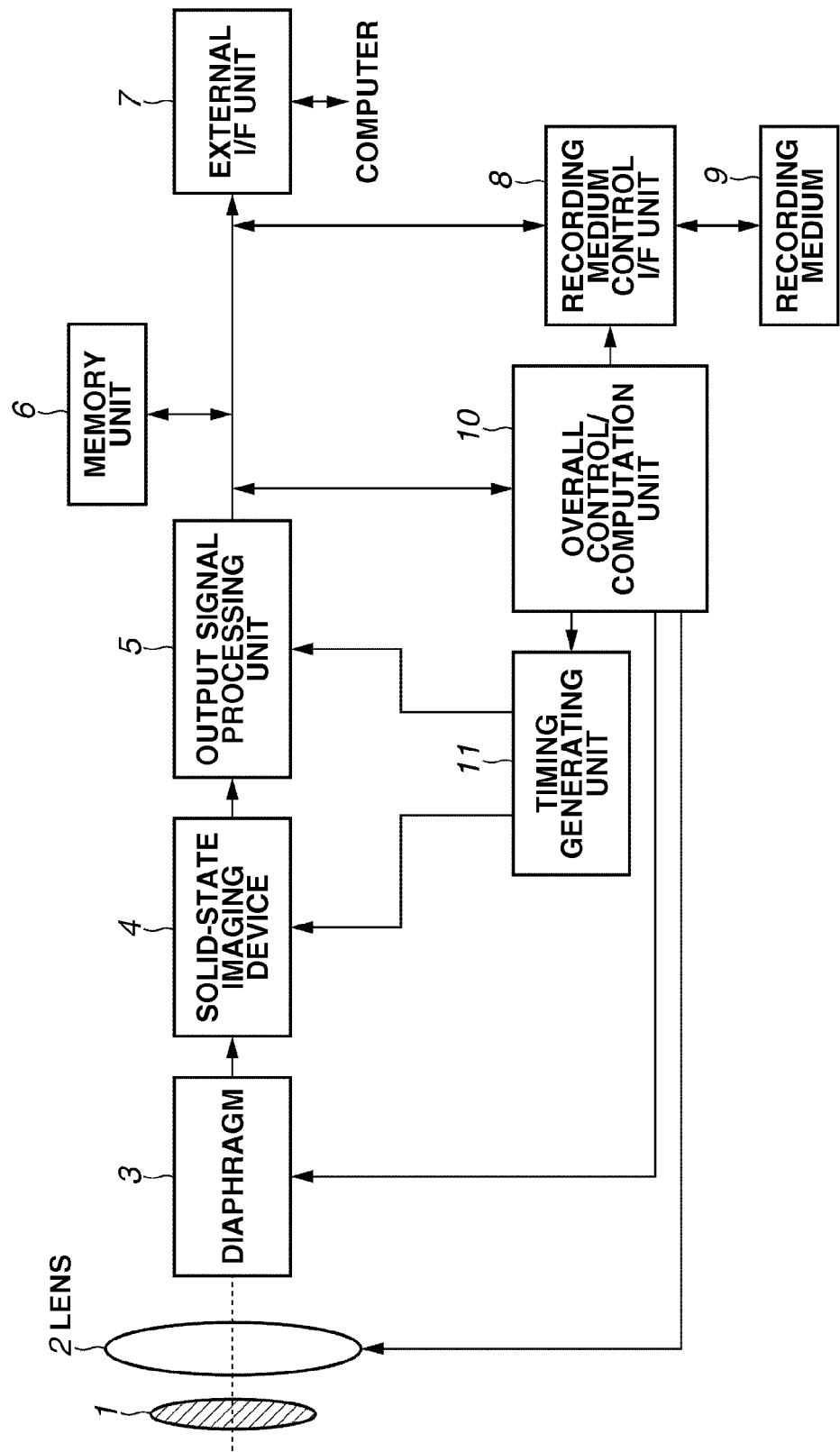
FIG. 13 is a block diagram illustrating a configuration of a solid-state imaging system according to an exemplary embodiment.

An exemplary embodiment in the case of applying the above-described solid-state imaging device to a solid-state imaging system is described hereinafter. A digital still camera, a digital camcorder, a monitoring camera, and the like may be cited as examples of the solid-state imaging system. FIG. 13 is a block diagram illustrating a configuration of a solid-state imaging system in a case where the solid-state imaging device is applied to a digital still camera serving as an example of the solid-state imaging system.

The solid-state imaging system illustrated in FIG. 13 includes a barrier 1 that protects a lens 2 which forms an optical image of a subject on the solid-state imaging device 4, a diaphragm 3 which changes an amount of light passing through the lens 2, and an output signal processing unit 5 which performs processing on a signal output from the solid-state imaging device 4.

If the signal output from the solid-state imaging device 4 is an analog signal, the output signal processing unit 5 is configured to include an analog signal processing unit, an analog-to-digital (A/N) converter, and a digital signal processing unit. The analog signal processing unit performs various types of correction processing on a signal output from the solid-state imaging device 4 and outputs a resultant signal to the A/D converter. Then, the A/D converter converts, into a digital signal, the signal output from the analog signal processing unit and outputs the digital signal to the digital signal processing unit. If necessary, the digital signal processing unit performs various types of correction and compression processing, and outputs the processed signal.

On the other hand, if the solid-state imaging device outputs a digital signal, similar to the case of the fifth exemplary embodiment, the output signal processing unit 5 is configured to include a digital signal processing unit, which performs various types of correction and compression processing on a digital signal output from the solid-state imaging device 4, if necessary, and outputs the processed signal.

Referring to FIG. 13, a memory unit 6 temporarily stores image data. An interface unit 8 is used to record and read image data on and from a removable recording medium 9, such as a semiconductor memory. An external interface unit 7 is used to communicate with an external computer or the like. An overall control/computation unit 10 performs various types of computation and controls the entire digital still camera. A timing generator 11 generates various timing signals and outputs the generated timing signals to the solid-state imaging device 4 and the output signal processing unit 5. However, a timing signal may be input from an external device. It is sufficient that the solid-state imaging system includes at least the solid-state imaging device 4 and the output signal processing unit 5, which performs processing on an output signal output from the solid-state imaging device 4.

As described above, the solid-state imaging system according to the present exemplary embodiment may perform an imaging operation using the solid-state imaging device 4. Low-noise image capturing may be implemented by applying the solid-state imaging device according to one of the first to seventh embodiments to the solid-state imaging system according to the present exemplary embodiment.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-107392 filed May 12, 2011, which is hereby incorporated by reference herein in its entirety.

What is claimed is:
1. A solid-state imaging device, comprising:
a plurality of effective pixels arranged in a plurality of rows and a plurality of columns, the effective pixel including a photoelectric conversion unit configured to generate electric charges by photoelectric conversion, and a first amplifying transistor configured to output a signal from a source of the first amplifying transistor, the signal being a signal based on the electric charges generated by the photoelectric conversion unit;
a plurality of reference pixels arranged corresponding to each of the plurality of columns, the reference pixel including a second amplifying transistor configured to output a signal from a source of the second amplifying transistor, the signal being a signal based on a voltage applied thereto;

a first signal line to which an effective pixel is connected, the first signal line being configured to transmit the signal output by from the source of the first amplifying transistor;

a second signal line to which a reference pixel is connected, the second signal line being configured to transmit the signal output from the source of the second amplifying transistor; and a difference signal output unit provided separately from the first amplifying transistor and the second amplifying transistor, the difference signal output unit being connected to the first signal line and the second signal line and configured to perform difference processing on a difference between the signal transmitted by the first amplifying transistor and the signal transmitted by the second amplifying transistor and to output a difference signal representing a result of the difference processing.

2. The solid-state imaging device according to claim 1, wherein the difference signal output unit includes a differential amplifier configured to output the difference signal as an analog signal.

3. The solid-state imaging device according to claim 2, wherein the difference signal output unit further includes a first amplifying unit and a second amplifying unit, wherein the first signal line is connected to the differential amplifier via the first amplifying unit, and wherein the second signal line is connected to the difference amplifier via the second amplifying unit.

4. The solid-state imaging device according to claim 1, wherein no effective pixel is arranged between the reference pixel arranged in a first column of the plurality of columns and the difference signal output unit connected to the reference pixel arranged in the first column.

5. The solid-state imaging device according to claim 1, further comprising:

a first transistor connected to the first signal line and configured to supply electric current; and a second transistor connected to the second signal line and configured to supply electric current, wherein a control signal line configured to apply a control signal to each of control electrodes of the first transistor and the second transistor is connected in common to the first transistor and the second transistor.

6. The solid-state imaging device according to claim 1, further comprising:

a first transistor including a first main electrode connected to the first signal line, a second main electrode connected to a power line, and a first control electrode; and a second transistor including a third main electrode connected to the second signal line, a fourth main electrode connected to the power line, and a second control electrode.

7. The solid-state imaging device according to claim 1, wherein a plurality of the reference pixels is connected in parallel to the second signal line.

8. The solid-state imaging device according to claim 1, wherein each of a plurality of the reference pixels includes an electric charge storing unit, and wherein a plurality of the electric charge storing units is connected in common to the second amplifying transistor.

9. The solid-state imaging device according to claim 1, wherein the solid-state imaging device includes a plurality of the difference signal output units and a plurality of columns each including the effective pixel and the reference pixel, and the reference pixels which a plurality of columns includes are connected in parallel to one of a plurality of the difference signal output units.

10. The solid-state imaging device according to claim 1, wherein the difference signal is an analog signal, and wherein the solid-state imaging device further comprises an analog-to-digital conversion unit configured to convert the difference signal into a digital signal.

11. A solid-state imaging system comprising:

the solid-state imaging device according to claim 1; and an output signal processing unit configured to process an output signal from the solid-state imaging device.

12. The solid-state imaging device according to claim 1, wherein an area of a control electrode of the second amplifying transistor is larger than that of a control electrode of the first amplifying transistor.

13. A solid-state imaging device, comprising:

an effective pixel including a photoelectric conversion unit configured to generate electric charges by photoelectric conversion and a first amplifying transistor configured to output a signal based on the electric charges generated by the photoelectric conversion unit;

a reference pixel including a second amplifying transistor configured to output a signal based on a voltage applied thereto;

a first signal line to which the effective pixel is connected, the first signal line being configured to transmit a signal output by the first amplifying transistor;

a second signal line to which the reference pixel is connected, the second signal line being configured to transmit a signal output by the second amplifying transistor; and a difference signal output unit provided separately from the first amplifying transistor and the second amplifying transistor, the difference signal output unit being connected to the first signal line and the second signal line and configured to perform difference processing on a difference between a signal output by the first amplifying transistor and a signal output by the second amplifying transistor and to output a difference signal representing a result of the difference processing, wherein a power source connected to the difference signal output unit is provided separately from a power source connected to the first amplifying transistor and the second amplifying transistor.

14. A solid-state imaging device, comprising:

an effective pixel including a photoelectric conversion unit configured to generate electric charges by photoelectric conversion and a first amplifying transistor configured to output a signal based on the electric charges generated by the photoelectric conversion unit;

a reference pixel including a second amplifying transistor configured to output a signal based on a voltage applied thereto;

a first signal line to which the effective pixel is connected, the first signal line being configured to transmit a signal output by the first amplifying transistor;

a second signal line to which the reference pixel is connected, the second signal line being configured to transmit a signal output by the second amplifying transistor; and a difference signal output unit provided separately from the first amplifying transistor and the second amplifying transistor, the difference signal output unit being connected to the first signal line and the second signal line and configured to perform difference processing on a difference between a signal output by the first amplifying transistor and a signal output by the second amplifying transistor and to output a difference signal representing a result of the difference processing, wherein an area of a control electrode of the second amplifying transistor is larger than that of a control electrode of the first amplifying transistor.

15. A solid-state imaging device, comprising:

an effective pixel including a photoelectric conversion unit configured to generate electric charges by photoelectric conversion and a first amplifying transistor configured to output a signal based on the electric charges generated by the photoelectric conversion unit;

a reference pixel including a second amplifying transistor configured to output a signal based on a voltage applied thereto;

a first signal line to which the effective pixel is connected, the first signal line being configured to transmit a signal output by the first amplifying transistor;

a second signal line to which the reference pixel is connected, the second signal line being configured to transmit a signal output by the second amplifying transistor; and a difference signal output unit provided separately from the first amplifying transistor and the second amplifying transistor, the difference signal output unit being connected to the first signal line and the second signal line and configured to perform difference processing on a difference between a signal output by the first amplifying transistor and a signal output by the second amplifying transistor and to output a difference signal representing a result of the difference processing, wherein the reference pixel is provided closer to the difference signal output unit than all of the effective pixels connected to the first signal line, wherein an area of a control electrode of the second amplifying transistor is larger than that of a control electrode of the first amplifying transistor.

16. A method for driving a solid-state imaging device, the solid-state imaging device comprising:

an effective pixel arranged in a plurality of rows and a plurality of columns, the effective pixel including a photoelectric conversion unit configured to generate electric charges by photoelectric conversion, and a first amplifying transistor configured to output a signal from a source of the first amplifying transistor, the signal being a signal based on the electric charge generated by the photoelectric conversion unit;

a reference pixel arranged corresponding to each of the plurality of columns, the reference pixel including a second amplifying transistor configured to output a signal from a source of the second amplifying transistor, the signal being a signal based on a voltage applied thereto;

a first signal line configured to transmit the signal output from the source of the first amplifying transistor;

a second signal line configured to transmit the signal output from the source of the second amplifying transistor; and a difference signal output unit provided separately from the first amplifying transistor and the second amplifying transistor, the method comprising:

transmitting the signal output from the source of the first amplifying transistor to the difference signal output unit through the first signal line, transmitting the signal output from the source of the second amplifying transistor to the difference signal output unit through the second signal line, and performing, via the difference signal output unit, difference processing on the signals transmitted through the first signal line and the signal transmitted through the second signal line.

17. The method according to claim 16, wherein the transmitting the signals includes an operation of simultaneously finishing both of transmission of the signal transmitted through the first signal line to the difference signal output unit and transmission of the signal transmitted through the second signal line to the difference signal output unit.

18. The method according to claim 16, wherein the plurality of columns simultaneously performs transmitting the signals to the difference signal output unit.

19. The method according to claim 16, wherein capacitors are provided on the first signal line and the second signal line, respectively, and wherein the capacitors perform correlated double sampling on signals respectively output from the source of the first amplifying transistor and the source of the second amplifying transistor.

20. The method according to claim 16, wherein the difference signal output unit is connected to a signal processing unit, and wherein the signal processing unit performs correlated double sampling on the difference signal output by the difference signal output unit.

* * * * *